(12) United States Patent
Polk, Jr. et al.

(10) Patent No.: US 7,955,550 B2
(45) Date of Patent: *Jun. 7, 2011

(54) METHOD OF PREPARING A MOLDED ARTICLE

(75) Inventors: Dale E. Polk, Jr., Titusville, FL (US); Victor Wolynski, Cocoa, FL (US)

(73) Assignee: LRM Industries International, Inc, Rockledge, FL (US)

( * ) Notice: Subject to any disclaimer, the term of this patent is extended or adjusted under 35 U.S.C. 154(b) by 501 days.

This patent is subject to a terminal disclaimer.

(21) Appl. No.: 12/052,145

(22) Filed: Mar. 20, 2008

(65) Prior Publication Data

US 2008/0258329 A1    Oct. 23, 2008

Related U.S. Application Data

(60) Provisional application No. 60/925,629, filed on Apr. 20, 2007.

(51) Int. Cl.
*B29C 51/10* (2006.01)

(52) U.S. Cl. ......... 264/547; 264/554; 264/322; 264/294

(58) Field of Classification Search ......................... None
See application file for complete search history.

(56) References Cited

U.S. PATENT DOCUMENTS

| | | | |
|---|---|---|---|
| 2,199,455 | A | 5/1940 | Berry |
| 2,929,450 | A | 3/1960 | Kurz |
| 2,995,186 | A | 8/1961 | De Montigny |
| 3,676,537 | A | 7/1972 | Winstead |
| 3,902,960 | A | 9/1975 | Zentner et al. |
| 3,931,383 | A | 1/1976 | Erlewine et al. |
| 4,039,609 | A | 8/1977 | Thiel et al. |
| 4,061,706 | A | 12/1977 | Duffield et al. |
| 4,123,320 | A | 10/1978 | Stone |

(Continued)

FOREIGN PATENT DOCUMENTS

GB        2101927        *  1/1983

(Continued)

*Primary Examiner* — Edmund H. Lee
(74) *Attorney, Agent, or Firm* — Michael A. Ervin; M.A. Ervin & Associates

(57) ABSTRACT

The method includes providing a mold apparatus (1) that includes, a first mold portion (11) having an interior mold surface (14) having a plurality of perforations (26) and a perimeter edge (17). The mold apparatus (11) further includes at least one tubular sheet retainer (35) having an exterior surface (38) having a plurality of perforations (41) and a longitudinal axis (44) that is oriented along at least a portion of the perimeter edge (17) of the first mold portion (11). Each tubular sheet retainer (35) is reversibly and controllably: (i) positionable along an x-, y- and/or z-axis relative to the perimeter edge (17); and (ii) rotatable around its longitudinal axis (44), toward and/or away from the perimeter edge (17). A heated thermoplastic sheet (95) is formed and contacted (while at a thermoformable temperature) with the interior surface (14) of the first mold portion (11) and the exterior surfaces (38) of the tubular sheet retainers (35). Reduced pressure is drawn through the perforations (41) of the tubular sheet retainers (35) thereby retaining a portion of the heated thermoplastic sheet (95) thereon. The tubular sheet retainers (35) are rotated and/or moved along the x-, y- and/or z-axes with the sheet retained thereon, relative to the perimeter edge (17). Reduced pressure is drawn through the perforations (26) of the interior mold surface (14), thereby drawing the heated thermoplastic sheet (95) into intimate contour matching contact there-with.

17 Claims, 13 Drawing Sheets

U.S. PATENT DOCUMENTS

| | | |
|---|---|---|
| 4,139,412 A | 2/1979 | Printz |
| 4,284,396 A | 8/1981 | Thissen et al. |
| 4,421,712 A | 12/1983 | Winstead |
| 4,508,670 A | 4/1985 | Janke |
| 4,542,596 A | 9/1985 | Bryand et al. |
| 4,693,784 A | 9/1987 | Aula et al. |
| 4,722,820 A | 2/1988 | Flecknoe-Brown |
| 4,994,229 A | 2/1991 | Flecknoe-Brown |
| 5,106,567 A | 4/1992 | Demerest |
| 5,162,124 A | 11/1992 | Hausler et al. |
| 5,314,325 A | 5/1994 | Bosler |
| 5,783,229 A | 7/1998 | Manlove |
| 5,829,980 A | 11/1998 | Sheridan et al. |
| 6,086,800 A | 7/2000 | Manlove |
| 6,294,114 B1 | 9/2001 | Muirhead |
| 6,328,194 B1 | 12/2001 | Meschenmoser |
| 6,394,783 B1 | 5/2002 | Dalgewicz, III et al. |
| 6,585,139 B1 | 7/2003 | Holtmann et al. |
| 6,719,551 B2 | 4/2004 | Polk, Jr. |
| 6,814,905 B1 | 11/2004 | Dalgewicz et al. |
| 6,869,558 B2 | 3/2005 | Polk, Jr. et al. |
| 6,900,547 B2 | 5/2005 | Polk, Jr. et al. |
| 7,008,213 B2 | 3/2006 | King |
| 7,040,038 B1 | 5/2006 | Beaumont |
| 2004/0253429 A1 | 12/2004 | Polk, Jr. et al. |
| 2004/0253430 A1 | 12/2004 | Polk, Jr. et al. |
| 2005/0040569 A1 | 2/2005 | Fitzell, Jr. |
| 2006/0008967 A1 | 1/2006 | Polk, Jr. et al. |

FOREIGN PATENT DOCUMENTS

| | | | |
|---|---|---|---|
| JP | 61104821 | * | 5/1986 |
| JP | 61104822 | * | 5/1986 |

* cited by examiner

METHOD OF PREPARING A MOLDED ARTICLE

The present nonprovisional patent application is entitled to and claims the right of priority under 35 U.S.C. §119(e) of U.S. Provisional Patent Application Ser. No. 60/925,629 filed Apr. 20, 2007, which is hereby incorporated herein in its entirety by reference.

FIELD OF THE INVENTION

The present invention relates to a method of preparing a molded article, and more particularly to a method of forming a shaped thermoplastic sheet. The method includes providing a mold apparatus that includes a first mold portion having a contoured and perforated interior mold surface, and a perimeter edge, and at least one tubular sheet retainer having a perforated exterior surface. The tubular sheet retainer is oriented longitudinally along at least a portion of the perimeter edge, and is reversibly positionable along an x-, y- and/or z-axis relative to the perimeter edge. In addition, the tubular sheet retainer is rotatable around its longitudinal axis towards and/or away from the perimeter edge. A heated thermoplastic sheet, which is formed from a thermoplastic composition, is contacted with and retained on a portion of the exterior surface of the sheet retainer by reduced pressure drawn through its perforated exterior surface. Reduced pressure is drawn through the perforations of the interior mold surface, and the heated thermoplastic sheet is resultantly drawn into contact therewith, so as to match the contour thereof. The tubular sheet retainer, with the heated thermoplastic sheet retained thereon, is moved (e.g., rotated) towards and/or away from the perimeter edge prior to, concurrently with and/or subsequently to drawing the heated thermoplastic sheet into contact with the interior mold surface. Such movement of the tubular sheet retainer assists contact of and contouring of the heated thermoplastic sheet with the interior mold surface. The present invention also relates to a mold apparatus that includes the first mold portion and the tubular sheet retainer(s).

BACKGROUND OF THE INVENTION

Single sheet thermoforming processes typically involve providing a preformed sheet of thermoplastic material (usually on a roll), heating the preformed thermoplastic sheet to a thermoformable temperature, and contacting the heated thermoplastic sheet with a shaped mold surface. The heated thermoplastic sheet is typically drawn into contact with the shaped mold surface by means of a vacuum being drawn through perforations in the mold surface.

Such prior art methods of single sheet thermoforming typically and undesirably involve multiple steps, such as separately forming the thermoplastic sheet, collecting the preformed thermoplastic sheet on a roll, shipping the roll of preformed thermoplastic sheet to a molder (or fabricator), and re-heating the preformed thermoplastic sheet prior to the thermoforming operation. In addition, such prior art methods of single sheet thermoforming also typically do not provide sufficient control of the thermoplastic sheet thickness over contoured (e.g., recessed) mold surfaces. For example, the molded thermoplastic sheet may be too thin (e.g., in deep drawn areas), and/or too thick in other areas. Such variability in molded sheet thickness may result in the final molded article having undesirably variable physical properties, such as crack failure, and aesthetic properties, such as an uneven visual appearance (e.g., irregular color).

Thermoforming processes that involve the continuous extrusion of a thermoplastic sheet, that is thermoformed using residual heat from the extruded thermoplastic sheet are known. See, for example, U.S. Pat. Nos. 6,814,905 B1, 6,086,800 and 4,061,706. Such continuous thermoforming methods, while perhaps addressing or eliminating some of the multiple steps involved with the use of preformed thermoplastic sheets, typically and undesirably do not provide sufficient control of the thermoplastic sheet thickness over contoured (e.g., recessed) mold surfaces.

It would be desirable to develop new thermoforming processes, and apparatuses used therewith, that minimize or eliminate the steps typically encountered with prior art methods. In addition, it would be further desirable that such newly developed methods and apparatae also provide improved control of the thickness of the molded thermoplastic sheet as it is formed and molded over contoured mold surfaces.

SUMMARY OF THE INVENTION

In accordance with the present invention, there is provided a method of preparing a molded article comprising:
(a) providing a mold apparatus comprising,
 (i) a first mold portion having an interior mold surface, and a perimeter edge, said interior mold surface having a contour and a plurality of perforations, and
 (ii) at least one tubular sheet retainer having an exterior surface, at least a portion of the exterior surface of said tubular sheet retainer having a plurality of perforations, said tubular sheet retainer having a longitudinal axis that is oriented along at least a portion of said perimeter edge, said tubular sheet retainer being reversibly positionable along at least one of an x-axis, a y-axis and a z-axis relative to said perimeter edge, and said tubular sheet retainer being rotatable around said longitudinal axis of said tubular sheet retainer;
(b) positioning said tubular sheet retainer such that at least a portion of the exterior surface of said tubular sheet retainer is located above said perimeter edge;
(c) forming, from at least one thermoplastic composition, a heated thermoplastic sheet having a temperature that allows said heated thermoplastic sheet to be thermoformable, said heated thermoplastic sheet having a first surface and a second surface;
(d) contacting a first portion of said second surface of said heated thermoplastic sheet with a portion of the exterior surface of said sheet retainer;
(e) drawing reduced pressure through said plurality of perforations of said exterior surface of said tubular sheet retainer, thereby retaining said first portion of said second surface of said heated thermoplastic sheet on the exterior surface of said tubular sheet retainer;
(f) contacting a second portion of the second surface of said heated thermoplastic sheet with at least a portion of the interior mold surface of said first mold portion;
(g) (i) rotating each tubular sheet retainer, around said longitudinal axis of said tubular sheet retainer, independently at least one of towards said perimeter edge and away from said perimeter edge, and
 (ii) moving each tubular sheet retainer independently at least one of towards said perimeter edge and away from said perimeter edge, in each case independently along at least one of said x-axis, said y-axis and said z-axis;
(h) drawing reduced pressure through said plurality of perforations of said interior mold surface of said first mold portion, such that said second portion of said second surface of said heated thermoplastic sheet substantially matches said contour of said interior mold surface of said first mold portion;

(i) cooling said heated thermoplastic sheet thereby forming a shaped thermoplastic sheet that retains said contour of said interior mold surface of said first mold portion; and (j) removing said shaped thermoplastic sheet from said first mold portion, wherein said shaped thermoplastic sheet is said molded article.

In further accordance with the present invention, there is also provided a sheet molding apparatus comprising:

(a) a first mold portion having an interior mold surface, and a perimeter edge, said interior mold surface having a contour and a plurality of perforations;

(b) a first vacuum apparatus that is in fluid communication with said first mold portion, said first vacuum apparatus controllably drawing reduced pressure through said plurality of perforations of said interior mold surface of said first mold portion;

(c) at least one tubular sheet retainer having an exterior surface, at least a portion of the exterior surface of said tubular sheet retainer having a plurality of perforations, said tubular sheet retainer having a longitudinal axis that is oriented along at least a portion of said perimeter edge; and (d) a second vacuum apparatus that is in fluid communication with said tubular sheet retainer, said second vacuum apparatus controllably drawing reduced pressure through said plurality of perforations of said exterior surface of said tubular sheet retainer, wherein said tubular sheet retainer is reversibly positionable along at least one of an x-axis, a y-axis and a z-axis relative to said perimeter edge, and said tubular sheet retainer is rotatable around said longitudinal axis of said tubular sheet retainer, further wherein, said exterior surface of said tubular sheet retainer is dimensioned to retain a first portion of a second surface of a heated thermoplastic sheet on the exterior surface of said tubular sheet retainer, when said second surface of said first portion of said heated thermoplastic sheet is contacted with said exterior surface of said tubular sheet retainer and reduced pressure is drawn through said plurality of perforations of said exterior surface of said tubular sheet retainer, and reversible rotation of said tubular sheet retainer around said longitudinal axis, and optional reversible positioning of said tubular sheet retainer along at least one of said x-axis, said y-axis and said z-axis relative to said perimeter edge, with said first portion of said second surface of a heated thermoplastic sheet being retained on the exterior surface of said tubular sheet retainer, assists a second portion of said second surface of said heated thermoplastic sheet being drawn to and matching the contour of said interior mold surface of said first mold portion when said second surface of said second portion of said heated thermoplastic sheet is contacted with said interior mold surface of said first mold portion and reduced pressure is drawn through said plurality of perforations of said interior mold surface of said first mold portion.

The features that characterize the present invention are pointed out with particularity in the claims, which are annexed to and form a part of this disclosure. These and other features of the invention, its operating advantages and the specific objects obtained by its use will be more fully understood from the following detailed description and accompanying drawings in which preferred embodiments of the invention are illustrated and described.

As used herein and in the claims, terms of orientation and position, such as "upper", "lower", "inner", "outer", "right", "left", "vertical", "horizontal", "top", "bottom", and similar terms, are used to describe the invention as oriented in the drawings. Unless otherwise indicated, the use of such terms is not intended to represent a limitation upon the scope of the invention, in that the invention may adopt alternative positions and orientations.

Unless otherwise indicated, all numbers or expressions, such as those expressing structural dimensions, quantities of ingredients, etc., as used in the specification and claims are understood as modified in all instances by the term "about".

DETAILED DESCRIPTION OF THE INVENTION

Figure 1:
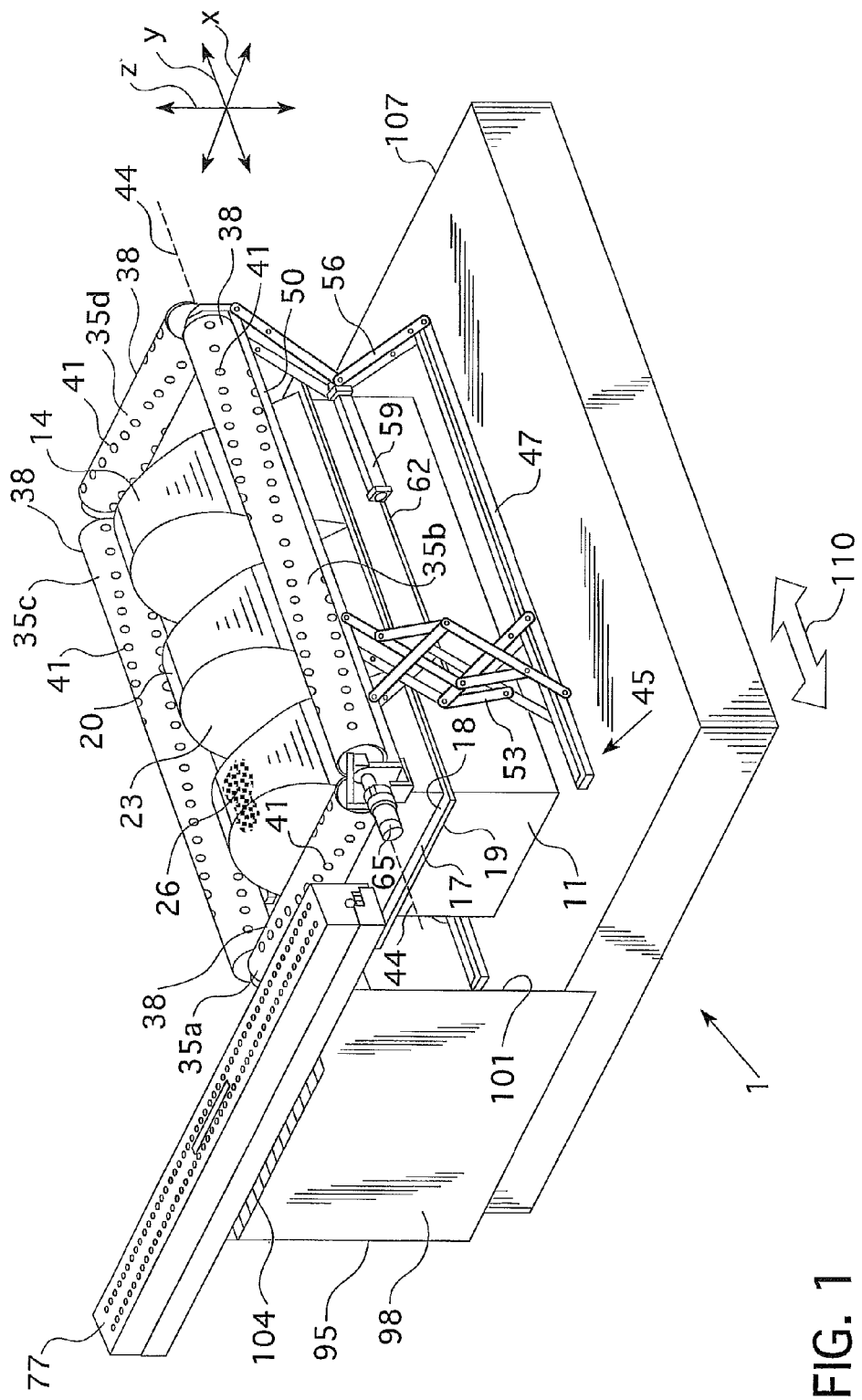
FIG. 1 is a representative perspective view of a sheet molding apparatus according to the present invention, with a heated thermoplastic sheet emerging from the sheet die.
Figure 2:
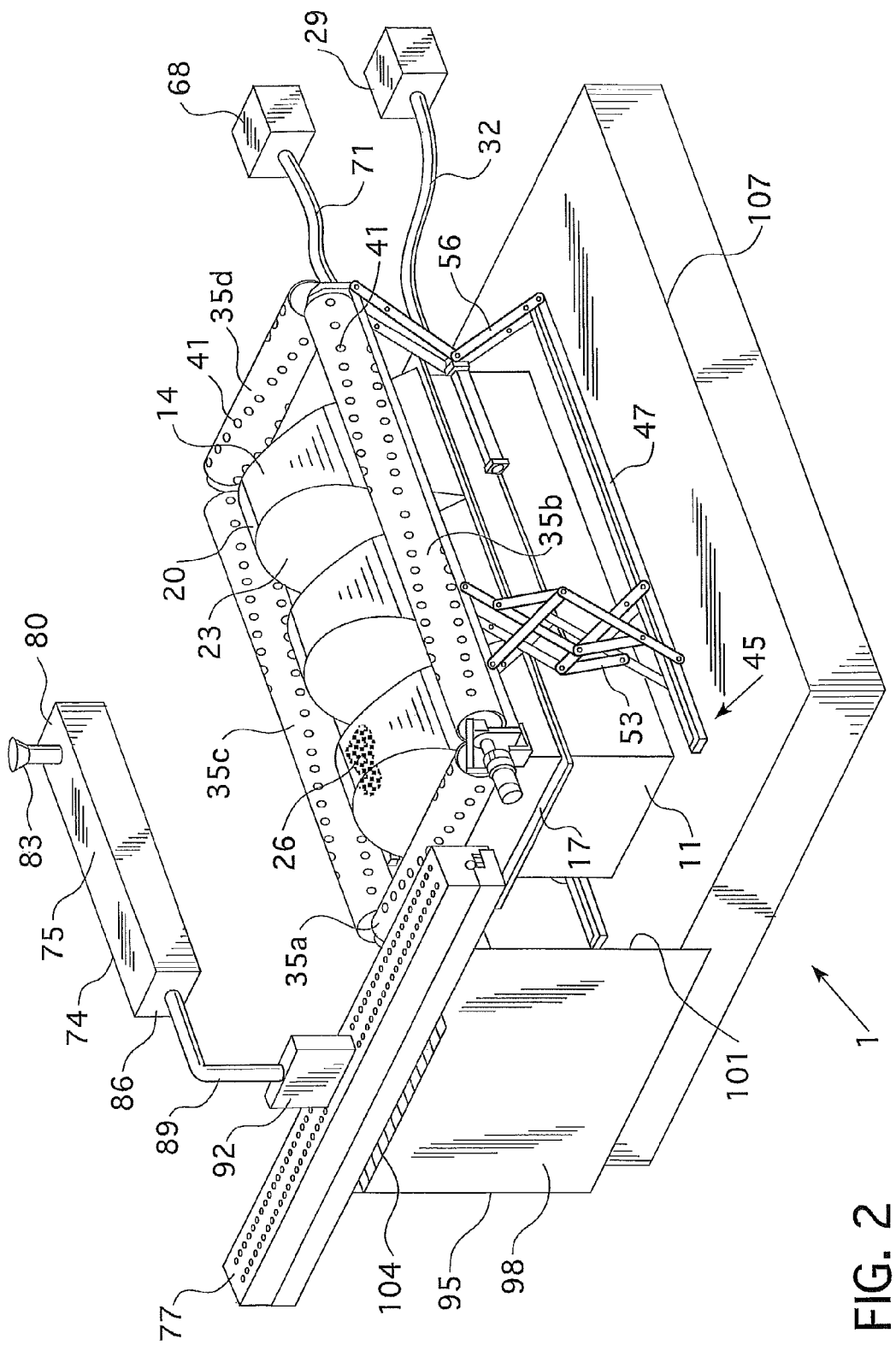
FIG. 2 is a representative perspective view of the sheet molding apparatus of FIG. 1, further including an extruder and separate vacuum pumps for the first mold portion and the tubular sheet retainers.

With reference to FIGS. 1 and 2, the method of the present invention involves providing a mold apparatus 1, and more particularly a sheet molding apparatus 1, that includes a first mold portion 11 having an interior mold surface 14 and a perimeter edge 17. Interior mold surface 14 has a contour and a plurality of perforations 26. The contour of interior mold surface 14 may include, for example, raised portions 20 and/or recessed portions 23. Interior mold surface 14 may be a substantially recessed or female interior mold surface (not shown), in which case it resides substantially below perimeter edge 17. Alternatively, interior mold surface 14 may be a substantially raised or male interior mold surface (as depicted), in which case a majority of interior mold surface 14 resides above perimeter edge 17. In addition, interior mold surface 14 may include relatively shallow (e.g., relative to raised portions 20 and recessed portions 23) raised and/or recessed patterns (not shown), such as grooves, for purposes of providing the surface of the molded article with texture and/or molded-in indicia.

Perimeter edge 17 typically defines the terminal extent of first mold portion 11 beyond which heated thermoplastic sheet, if any, extending there-beyond does not form a portion of the final molded article. Typically, thermoplastic sheet, if any, extending beyond perimeter edge 17 is removed (e.g., cut away) from the final molded article. Perimeter edge 17 may have any suitable shape, such as rounded, polygonal, irregular or combinations thereof. As depicted in the drawings, perimeter edge 17 is in the form of a substantially horizontal shelf having an upper surface 18 and a terminal edge 19.

For purposes of clarity, the plurality of perforations 26 are only depicted in FIGS. 1 and 2, and only over a portion of interior mold surface 14. Perforations 26 may be located over substantially the entirety of interior mold surface 14 or in zones (or clusters). Perforations 26 may be arranged substantially uniformly or non-uniformly (e.g., randomly) over interior mold surface 14. If located in zones, portions of interior mold surface 14 may be free of perforations. The plurality of perforations are typically arranged (or located) uniformly over substantially the entirety of interior mold surface 14.

The plurality of perforations are in fluid communication with at least one vacuum apparatus, such as a vacuum pump. Typically, first mold portion 11 has at least one interior chamber (not shown) that is in fluid communication with the plurality of perforations 26 and at least one vacuum apparatus, for example first vacuum apparatus 29 by means of conduit 32, as depicted in FIG. 2. Conduit 32 may be a rigid conduit, but more typically is fabricated from a flexible material that may be reversibly coiled. First vacuum apparatus 29 controllably draws reduced pressure through the plurality of perforations in interior mold surface 14. For example, the reduced pressure drawn through perforations 26 may be ramped in stages with at least one pressure plateau, or the reduced pressure may be drawn at the full capacity of vacuum apparatus 29 from the instant it is turned on.

To assist removing the molded article from first mold portion 11, a gas (e.g., air) may be passed out of perforations 26 at elevated pressure (i.e., at a pressure greater than ambient atmospheric pressure). To pass a gas, such as air, at elevated pressure through perforations 26, first vacuum apparatus 29 may be operated in reverse, and/or a separate pressure pump (not shown) may be used in fluid communication with the internal chamber and correspondingly perforations 26 of first mold portion 11. In addition, the gas passed out of perforations 26 may be cooled to a temperature less than ambient temperature (e.g., a temperature less than 25° C., such as 5° C. to 15° C.) to further assist cooling the heated thermoplastic sheet, such that it retains the contour shape of interior mold surface 14.

The plurality of perforations in interior mold surface 14 may have any suitable shape and dimension, provided they: (i) are not fouled, occluded or otherwise clogged with thermoplastic material when the molded article is removed from first mold portion 11; and (ii) do not result in undesirable surface features or defects on the final molded article (e.g., plastic nubs extending therefrom). The perforations in interior mold surface 14 may have cross-sectional shapes selected from polygonal shapes (e.g., triangles, rectangles, squares, pentagons, hexagons, heptagons, octagons, etc., and combinations thereof), circles, ovals, irregular shapes, and combinations thereof. Typically, the perforations of interior mold surface 14 have substantially circular cross-sectional shapes having diameters of from 0.1 mm to 7 mm, more typically from 0.5 mm to 5 mm, and further typically from 1 mm to 3 mm. In an embodiment of the present invention, the perforations of interior mold surface 14 have substantially circular cross-sectional shapes having diameters of 1.6 mm (1/16 inch).

The sheet molding apparatus of the present invention also includes at least one tubular sheet retainer. As depicted in the drawings, sheet molding apparatus 1 includes four tubular sheet retainers, 35a, 35b, 35c and 35d, which may be referred to herein collectively and individually as sheet retainer 35. Each tubular sheet retainer 35 has an exterior surface 38, and a longitudinal axis 44. At least a portion of exterior surface 38 of each tubular sheet retainer has a plurality of perforations 41. Longitudinal axis 44 of each tubular sheet retainer 35 is oriented along (e.g., substantially parallel with) at least a portion of perimeter edge 17 of first mold portion 11. As depicted in the drawings, tubular sheet retainers 35a, 35b, 35c and 35d are positioned and oriented so as to substantially encompass the totality of perimeter edge 17.

Each tubular sheet retainer 35 is reversibly and controllably positionable along an x-axis, a y-axis and/or a z-axis relative to perimeter edge 17 of first mold portion 14 (FIG. 1). For purposes of illustration, as depicted in FIGS. 1 and 2, each tubular sheet retainer is initially positioned above (along the positive z-axis), and outward from (along the positive x-axis) relative to perimeter edge 17. Each tubular sheet retainer 35 is reversibly and controllably positionable along the z-axis (e.g., up and down) relative to perimeter edge 17 by suitable means. The tubular sheet retainer may be reversibly and controllably positionable by art-recognized means. For example, each tubular sheet retainer 35 may rest fixedly on one or more pistons (not shown) that are reversibly and controllably positionable along the z-axis.

Figure 3:
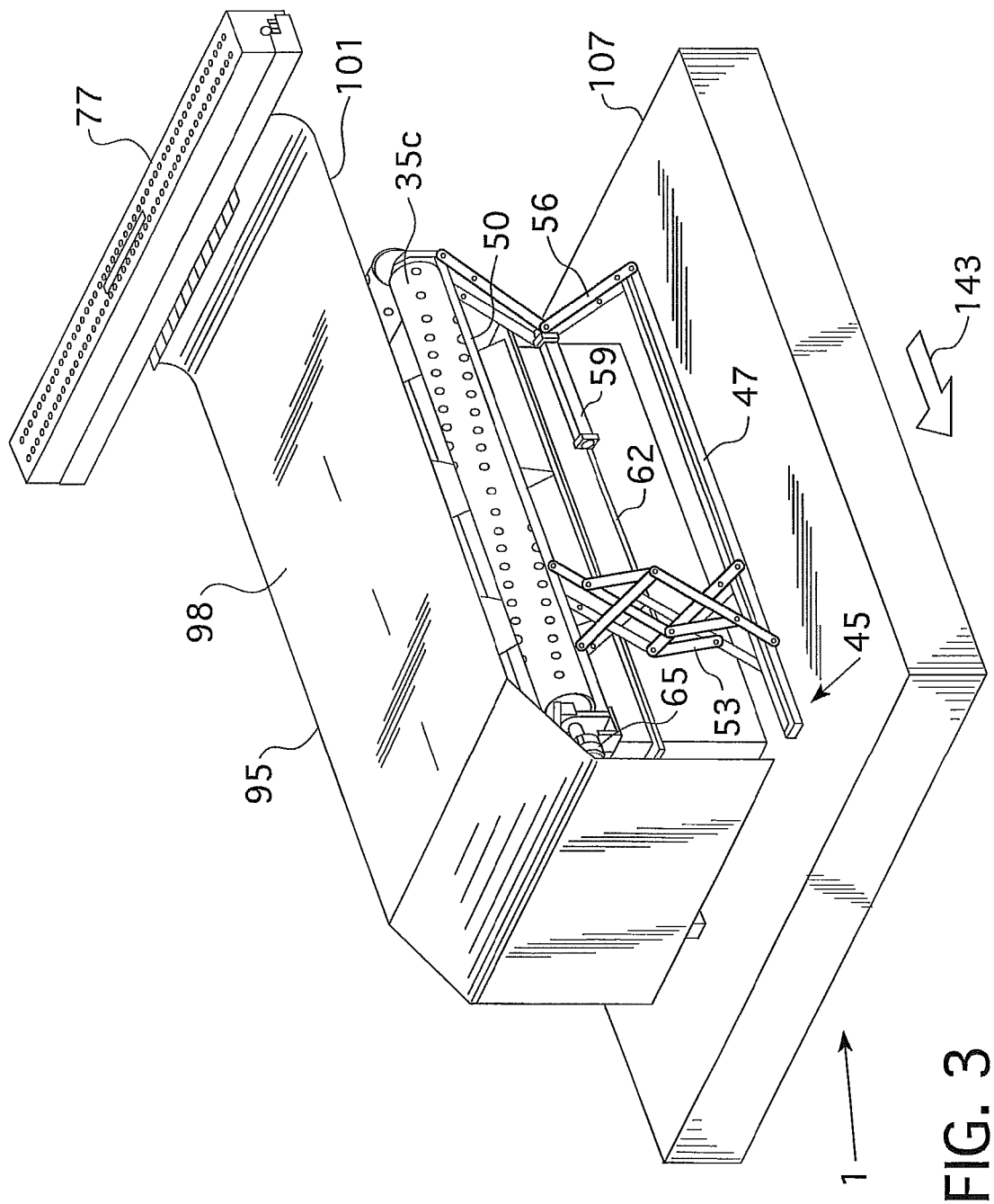
FIG. 3 is a representative perspective view of the sheet molding apparatus of FIG. 1, in which the heated thermoplastic sheet extends across the first mold portion and the tubular sheet retainers.

Each tubular sheet retainer 35 may rest fixedly on one or more scissor jacks that are reversibly and controllably positionable along the z-axis, and optionally the y-axis. As depicted in FIGS. 1, 2 and 3, tubular sheet retainers 35b and 35c each reside on a scissor jack apparatus 45 that includes a base 47, a top plate 50 that is connected to tubular sheet retainer 35b (equivalently for 35c), a first scissor jack element 53 and a second scissor jack element 56. The first 53 and second 56 scissor jack elements are connected to base plate 47 and top plate 50. The first 53 and second 56 scissor jack elements may be operated independently or in unison. If the scissor jack elements are operated independently, different portions of the tubular sheet retainers may be raised or lowered at different times. In an embodiment of the present invention, the first 53 and second 56 scissor jack elements are operated in unison by means of a piston 59 and rod 62 apparatus extending laterally and connectedly between the scissor jack elements. When rod 62 is drawn within piston 59, the first 53 and second 56 scissor jack elements collapse, and the tubular sheet retainer attached to upper plate 50 moves downward along the z-axis. Alternatively, when rod 62 is driven out of piston 59, the first 53 and second 56 scissor jack elements open up (e.g., expand, extending outward or upward), and the tubular sheet retainer attached to upper plate 50 moves upward along the z-axis.

Tubular sheet retainers 35*b* and 35*c* each reside on a separate scissor jack apparatus 45. The remaining tubular sheet retainers 35*a* and 35*d*, as depicted, do not rest directly on a scissor jack apparatus, but are each attached to tubular sheet retainers 35*b* and 35*c*, and correspondingly as tubular sheet retainer 35*b* and 35*c* move along the z-axis, so do tubular sheet retainers 35*a* and 35*d*. Alternatively, and as discussed previously, each sheet retainer 35 may move independently of each other tubular sheet retainer along the x-, y- and/or z-axis.

As is known to the skilled artisan, scissor jacks (e.g., partial scissor jacks such as scissor jack element 56) may be employed and oriented so as to move an article resting thereon, such as a tubular sheet retainer 35, along both the z-axis and y-axis as they are collapsed and/or extended. A tubular sheet retainer may be reversibly and controllably moveably independently along the x-axis and/or y-axis relative to perimeter edge 17 by art-recognized means and methods. For example, base plate 47 of scissor jack apparatus 45 may be reversibly and controllably moveably on rails (not shown) oriented along the x-axis and/or the y-axis relative to perimeter edge 17.

In addition to being reversibly and controllably positionable along the x-, y- and/or z-axes relative to perimeter edge 17, each tubular sheet retainer 35 is independently rotatable around its longitudinal axis (e.g., longitudinal axis 44). Each tubular sheet retainer 35 may be reversibly and controllably rotatable about its longitudinal axis 44 away from and/or towards perimeter edge 17. Reversible and controllable rotation of each tubular sheet retainer 35 around its longitudinal axis 44 may be achieved by art-recognized means and methods. For example, in FIGS. 1 and 3, tubular sheet retainers 35*b* and 35*c* are each independently engaged with a motor 65 that rotates them each controllably and reversibly about their respective longitudinal axes 44. The remaining tubular sheet retainers may also be independently attached to additional motors (not shown). Alternatively, rotation of tubular sheet retainers 35*b* and 35*c* may be translated or transferred correspondingly into rotation of tubular sheet retainers 35*a* and 35*b* by means of intermeshing transfer gears (not shown), as is known to the skilled artisan.

The plurality of perforations 41 of exterior surface 38 of each tubular sheet retainer 35 may be arranged over the entirety or over portions (e.g., in zones) of exterior surface 38. Perforations 41 may be arranged substantially uniformly, non-uniformly (e.g., randomly), or in patterns over exterior surface 38. If located in zones, portions of exterior surface 38 of tubular sheet retainer 35 may be free of perforations. Perforations 41 may be positioned or located in zones on exterior tubular sheet retainer surface 38 for purposes of differential pulling or stretching of the heated thermoplastic sheet retained thereon. For example, the heated thermoplastic sheet being pulled or stretched in those tubular sheet retainer zones having perforations, and not being pulled or stretched in those tubular sheet retainer zones that are free of perforations. Such differential pulling or stretching of the heated thermoplastic sheet during the molding process may be desirable for reasons including, but not limited to, controlling the thickness of the heated thermoplastic sheet over different areas of the interior surface 14 of first mold portion 11. In those areas subjected to pulling or stretching by the tubular sheet retainer (due to the presence of perforations in an exterior surface zone of the tubular sheet retainer having reduced pressure drawn there-through), the heated thermoplastic sheet will typically be thinner over interior surface 14 of first mold portion 11. Correspondingly, in those areas not subjected to pulling or stretching (due to an absence of perforations in the exterior surface of that zone of the tubular sheet retainer), the heated thermoplastic sheet will typically be thicker over interior surface 14 of first mold portion 11.

The plurality of perforations 41 are typically arranged (or located) uniformly over substantially the entirety of exterior surface 38 of each tubular sheet retainer 35. As depicted in the drawing figures, perforations 41 are arranged substantially helically in exterior surface 38 of each tubular sheet retainer 35.

The plurality of perforations 41 of each tubular sheet retainer 35 are in fluid communication with at least one vacuum apparatus, such as a vacuum pump. Typically, each tubular sheet retainer has at least one interior chamber (not shown) that is in fluid communication with the plurality of perforations 41 and at least one vacuum apparatus, for example second vacuum apparatus 68 by means of conduit 71, as depicted in FIG. 2. For purposes of clarity, only tubular sheet retainer 35*b* is depicted as being in fluid communication with second vacuum apparatus 68. Each tubular sheet retainer may be in fluid communication with a separate second vacuum apparatus, or they may each be in fluid communication with the same second vacuum apparatus. Conduit 71 may be a rigid conduit, but more typically is fabricated from a flexible material that may be reversibly coiled. Second vacuum apparatus 68 controllably draws reduced pressure through the plurality of perforations 41 of exterior tubular sheet retainer surface 38. For example, the reduced pressure drawn through perforations 41 may be ramped in stages with at least one pressure plateau, or the reduced pressure may be drawn at the full capacity of second vacuum apparatus 68 from the instant it is turned on.

Typically after the process of molding the molded article is complete, the heated thermoplastic sheet is removed from the tubular sheet retainers. To assist removing the heated thermoplastic sheet from each tubular sheet retainer 35, a gas (e.g., air) may be passed out of perforations 41 at elevated pressure (i.e., at a pressure greater than ambient atmospheric pressure). To pass a gas, such as air, at elevated pressure through perforations 41, second vacuum apparatus 68 may be operated in reverse, and/or a separate pressure pump (not shown) may be used in fluid communication with the internal chamber and correspondingly perforations 41 of tubular sheet retainer 35. In addition, the gas passed out of perforations 41 may be cooled to a temperature less than ambient temperature (e.g., a temperature less than 25° C., such as 5° C. to 15° C.) to further assist cooling and removal of the heated thermoplastic sheet from the tubular sheet retainers 35.

The plurality of perforations 41 in exterior surface 38 of each tubular sheet retainer 35 may have any suitable shape and dimension, provided they are not fouled, occluded or otherwise clogged with thermoplastic material that is retained thereon during mold formation of the final molded article. Since the thermoplastic material retained on the tubular sheet retainers 35 typically does not form a part of the final molded article, the formation of surface features (such as extended plastic nubs) thereon by the perforations 41 of the tubular sheet retainers 35 is typically not a concern. As such, perforations 41 of the tubular sheet retainers 35 may be larger than the perforations 26 of interior mold surface 14 of first mold portion 11. The perforations 41 of exterior surface 38 of each tubular sheet retainer 35 may have cross-sectional shapes selected from polygonal shapes (e.g., triangles, rectangles, squares, pentagons, hexagons, heptagons, octagons, etc., and combinations thereof), circles, ovals, irregular shapes, and combinations thereof. Typically, the perforations 41 of exterior surface 38 of each tubular sheet retainer 35 have substantially circular cross-sectional shapes having diameters of from 0.1 mm to 7 mm, more typically from 0.5 mm to 6 mm, and further typically from 1 mm to 4 mm. In an embodiment of the present invention, the perforations 41 of exterior surface 38 of each tubular sheet retainer 35 have substantially circular cross-sectional shapes having diameters of 1.6 mm (1/16 inch) or 3.2 mm (1/8 inch).

Each tubular sheet retainer may have a cross sectional shape selected independently from polygonal shapes (e.g., triangles, rectangles, squares, pentagons, hexagons, heptagons, octagons, etc., and combinations thereof), circles, ovals (e.g., elliptical shapes), irregular shapes, and combinations thereof. Typically, each tubular sheet retainer has a substantially circular cross sectional shape, and accordingly each tubular sheet retainer is a substantially cylindrical sheet retainer.

The exterior surface of each tubular sheet retainer is dimensioned so as to retain a first portion of the second surface of the heated thermoplastic sheet thereon, as will be discussed in further detail herein. The dimensions of the exterior surface of the tubular sheet retainer are typically selected such that the heated thermoplastic sheet is both sufficiently retained thereon, and rotation of the tubular sheet retainer around its longitudinal axis sufficiently pulls/stretches or slacks the sheet (whether it is rotated away or towards the perimeter edge). In an embodiment of the present invention, substantially cylindrical sheet retainers are employed, and the dimensions thereof are selected so as to provide exterior surface area values of from 7316 $cm^2$ to 23,348 $cm^2$ (1134 to 3619 $inches^2$), and more typically from 11,309 $cm^2$ to 19,335 $cm^2$ (1753 to 2997 $inches^2$). In an embodiment, the cylindrical sheet retainers have an exterior surface area value of approximately 16,576 $cm^2$ (2569 $inches^2$).

Substantially cylindrical sheet retainers that may be employed according to the present invention typically have cross sectional circular diameters of 10.2 cm to 30.5 cm (4 to 12 inches), and more typically from 15.2 cm to 25.4 cm (6 to 10 inches). In an embodiment, the substantially cylindrical sheet retainers have a cross sectional circular diameter of approximately 21.9 cm (8.6 inches).

The tubular sheet retainers may have any suitable length, provided they extend along at least a portion of the perimeter edge of the first mold portion. Typically, each tubular sheet retainer has a length of from 91 cm to 609 cm (3 to 20 feet), more typically from 122 cm to 457 cm (4 to 15 feet), and further typically from 182 cm to 304 cm (6 to 10 feet). In an embodiment, tubular sheet retainers 35*a* and 35*d* each have a length of 122 cm (4 feet), and tubular sheet retainers 35*c* and 35*b* each have a length of 244 cm (8 feet).

The tubular sheet retainers may be fabricated from any suitable rigid material. For example, each sheet retainer may be fabricated from metals, thermoset plastic materials, thermoplastic materials, ceramic materials and combinations thereof. Typically the tubular sheet retainers are fabricated from metals (e.g., steel), and the exterior surfaces thereof are formed from polished metal.

The sheet molding apparatus of the present invention may further include an extruder 74 and a sheet die 77 (FIG. 2). The extruder includes a feed end 80 having a feed port 83, and a terminal end 86. Extruder 74 may be selected from single screw, or counter- or co-rotating twin screw extruders that are known to the skilled artisan. Extruder 74 typically includes one or more heated zones along the length of its barrel 75, the temperature(s) of which is controllable. A thermoplastic composition, typically comprising at least one thermoplastic polymer and optionally one or more additives (e.g., glass fibers and/or antioxidants), is introduced into feed port 83, is melted and compounded as it moves through barrel 75, and emerges from terminal end 86 as a molten thermoplastic composition.

Terminal end 86 of extruder 74 is in fluid communication with sheet die 77. Fluid communication between terminal end 86 and sheet die 77 is typically achieved by means of a conduit 89, and optionally an expander 92 that is in fluid communication with and interposed between conduit 89 and sheet die 77. Conduit 89 and optional expander 92 may each be independently heated. The molten thermoplastic composition is forwarded from terminal end 86 of extruder 74, through conduit 89 and expander 92, and into sheet die 77. Sheet die 77 typically includes at least one interior channel that is in fluid communication with expander 92 and a slot (not shown). Passage of the molten thermoplastic material through the interior channel(s) and slot of sheet die 77 results in formation of a heated thermoplastic sheet 95 having a first surface 98 and a second surface 101.

Sheet die 77 may be a dynamic sheet die having a plurality of gates 104 that may be controllably and reversibly moved, by separate actuators (not shown), across the slot of sheet die 77 so as to control the amount of molten thermoplastic material passing there-through, and accordingly the thickness, width and shape of the heated thermoplastic sheet emerging therefrom and produced thereby. Gates 104 may be operated so as to produce a heated thermoplastic sheet having openings (not shown) that are free of thermoplastic material. For example, as heated thermoplastic sheet 95 is formed, some of the gates 104 forming interior portions of the sheet, may be closed for a predetermined amount of time and then reopened, thereby resulting is openings or slots being formed in the sheet.

Rather than a slot, sheet die 77 may have a plurality of laterally aligned openings (not shown) through which the molten thermoplastic material emerges. The openings are positioned such that molten thermoplastic material emerging from one opening merges and becomes continuous with the molten thermoplastic material emerging from its adjacent/neighboring opening(s), thereby forming the heated thermoplastic sheet. The plurality of laterally aligned openings in effect acting as a slot with regard to formation of the heated thermoplastic sheet. Each opening may have a reversibly and controllably closeable gate 104 associated therewith.

Sheet die 77, and first mold portion 11 and the tubular sheet retainers 35 may be positioned relative to each other in any suitable way, provided that the heated thermoplastic sheet 95 emerging from sheet die 77 may be contacted with each tubular sheet retainer 35 and interior mold surface 14 of first mold portion 11. For example, sheet die 77 may be positioned so as to produce a heated thermoplastic sheet 95 that drops gravitationally downward (as depicted), and first mold portion 11 and the tubular sheet retainers 35 may together be positioned vertically (not depicted) so as to be parallel with the plane of the gravitationally dropping heated thermoplastic sheet.

In an embodiment of the present invention and as depicted in the drawings, first mold portion 11 and each tubular sheet retainer 35 are together positioned in a plane beneath sheet die 77, e.g., the plane defined by the x- and y-axes shown in FIG. 1. For purposes of reference, perimeter edge 17 lies substantially within the plane defined by the x- and y-axes of FIG. 1. As the heated thermoplastic sheet 95 is formed and drops vertically and gravitationally from sheet die 77: (i) sheet die 77 may be reversibly moveable above the plane in which first mold portion 11 and each tubular sheet retainer 35 resides; and/or (ii) first mold portion 11 and each tubular sheet retainer 35 may together be reversibly positionable in the plane beneath sheet die 77. Such relative movement of sheet die 77, and first mold portion 11 and each tubular sheet retainer 35 provides for contact of second sheet surface 101 with interior mold surface 14 of first mold portion 11 and the exterior surfaces 38 of each tubular sheet retainer 35. Sheet die 77 may be reversibly moveable by known means, such as on tracks or rails (not shown).

In an embodiment of the present invention, first mold portion 11 and each tubular sheet retainer 35 are together positioned and are reversibly moveable in a plane beneath sheet die 77, and sheet die 77 is substantially stationary.

To achieve reversible movement of first mold portion 11 and the tubular sheet retainers 35 in concert in the plane beneath sheet die 77, first mold portion 11 and each tubular sheet retainer 35 together reside on a platform 107. Typically, first mold portion 11 and the tubular sheet retainers are fixedly attached to platform 107 (e.g., by fasteners, such as bolts—not shown). In an embodiment, and with regard to tubular sheet retainers 35, base plates 47 of scissor jack apparatuses 45 are fixedly attached to platform 107. Platform 107 is positioned and reversibly moveable in the plane beneath sheet die 77 along the y-axis (e.g., as represented by the two headed arrow 110 of FIG. 1).

Platform 107 may be reversibly moveable in the plane beneath sheet die 77 by known locomotion means, such as skids, tracks, wheels alone, wheels in conjunction with rails, and combinations thereof. Platform 107 may further include a vertically positionable plate (not shown) on which first mold portion 11 and the tubular sheet retainers 35 may together reside. The vertically positionable plate is reversibly positionable along the z-axis, thereby moving first mold portion 11 and the tubular sheet retainers 35 together along the z-axis (e.g., vertically). Vertical movement of first mold portion 11 and the tubular sheet retainers 35 may be undertaken for reasons including, but not limited to, positioning interior surface 14 of first mold portion 11 and exterior tubular sheet retainer surfaces 38 closer to or further from sheet die 77, and more particularly closer to/further from the slot of sheet die 77 from which the heated thermoplastic sheet 95 emerges.

In the method of the present invention, the tubular sheet retainers 35 are initially positioned such that at least a portion of their exterior surface 38 is located above perimeter edge 17 of first mold portion 14 (along the z-axis). See FIGS. 1 and 2. When the first mold portion is a first male mold portion (as depicted in the drawings), the initial position of the tubular sheet retainers may be, in addition to being above the perimeter edge: (i) above the upper terminus of the interior mold surface of the first male mold portion; or (ii) above the perimeter edge and below the upper terminus of the interior mold surface. As depicted in the drawing figures, the tubular sheet retainers 35 are initially positioned above perimeter edge 17 and below the upper terminus of interior mold surface 14. In the case of a female first mold portion (that is substantially recessed below the perimeter edge), the initial position of the tubular sheet retainers is such that at least a portion of the exterior surfaces thereof are above the perimeter edge of the first female mold portion. As described previously herein, the tubular sheet retainers are reversibly and controllably positionable along at least one of the x-, y- and z-axes, for example substantially along the z-axis by means of scissor apparatuses 45.

A heated thermoplastic sheet (e.g., 95) having a first surface (e.g., 98) and a second surface (e.g., 101) is formed from at least one thermoplastic composition, in the method of the present invention. The heated thermoplastic sheet has a temperature that allows it to be thermoformable (e.g., a thermoformable temperature), in particular when: (i) contacted and retained on the exterior surfaces of the tubular sheet retainers; and (ii) contacted and drawn into intimate contoured contact with the interior mold surface of the first mold portion. While the temperature of the heated thermoplastic sheet may be equal to or greater than the melting point of the thermoplastic sheet, the temperature of the heated thermoplastic sheet is more typically within a range that is equal to or greater than the softening point (or glass transition temperature) of the thermoplastic sheet, and less than or equal to the melting point of the thermoplastic sheet (i.e., and equivalently, the softening point/Tg and melting point, respectively, of the thermoplastic composition from which the thermoplastic sheet is formed).

In an embodiment of the method of the present invention, the heated thermoplastic sheet has an interior portion that is interposed between the first and second surfaces of the heated thermoplastic sheet. The temperature of the heated thermoplastic sheet, in this embodiment, is substantially uniform (e.g., varying by less than or equal to 5° C., or more typically less than or equal to 2° C.) through the first surface, the interior portion and the second surface thereof. In particular, the temperature is substantially uniform when: (i) the first portion of the second surface of the heated thermoplastic sheet is drawn against the exterior surface of each tubular sheet retainer; and (ii) the second portion of the second surface of the heated thermoplastic sheet is drawn against the interior mold surface of the first mold portion.

The temperature of the heated thermoplastic sheet may be determined by art-recognized methods, such as contacting thermocouples with the first and second surfaces of the heated thermoplastic sheet, and inserting a thermocouple into the interior portion of the heated thermoplastic sheet. Alternatively, or in addition thereto, remote temperature sensors, such as an infrared sensor, may be used to determine the temperature of the first and second surfaces of the heated thermoplastic sheet.

As used herein and in the claims, the term "sheet(s)" and similar terms, such as "sheet die(s)" are inclusive of the term "film(s)", and similar terms, such as "film die(s)". Upon emerging from the sheet die, and more particularly the slot of the sheet die, the heated thermoplastic sheet typically has a thickness of from 0.5 mm to 25 mm, more typically from 1.5 mm to 15 mm, and further typically from 6 mm to 12 mm. In an embodiment of the present invention, upon emerging from the sheet die the heated thermoplastic sheet has a thickness of 9 mm. The shaped thermoplastic sheet of the molded article prepared by the method of the present invention, typically has a thickness of from 0.25 mm to 12.5 mm, more typically from 0.75 mm to 8 mm, and further typically from 3 mm to 6 mm. In an embodiment of the present invention, the shaped thermoplastic sheet of the molded article prepared by the method of the present invention has an average thickness of 4.5 mm.

The heated thermoplastic sheet may be formed by known methods that involve melting a thermoplastic composition so as to form a molten thermoplastic composition, and then forming a heated thermoplastic sheet from the molten thermoplastic composition. In an embodiment, and as described previously herein, the thermoplastic composition is melted in an extruder 75 (e.g., a single screw, or co- or counter-rotating twin screw extruder) having a feed end 80 having a feed port 83, and a terminal end 86. The terminal end of the extruder is in fluid communication with a sheet die 77 (e.g., by means of conduit 89 and expander 92). A molten thermoplastic composition is formed within the extruder and forwarded to (by means of conduit 89 and expander 92) and passed through sheet die 77, so as to form the heated thermoplastic sheet (e.g., 95). The heated thermoplastic sheet typically emerges from a slot in the sheet die, and drops vertically and gravitationally therefrom. The sheet die may be selected and operated in accordance with the description provided previously herein.

The heated thermoplastic sheet 95 emerges from sheet die 77 such that the second surface 101 thereof faces (e.g., is in facing opposition to) the tubular sheet retainers 35 and interior mold surface 14 of first mold portion 11. The first surface 98 of heated thermoplastic sheet 95 faces away from the tubular sheet retainers 35 and interior mold surface 14.

Figure 9:
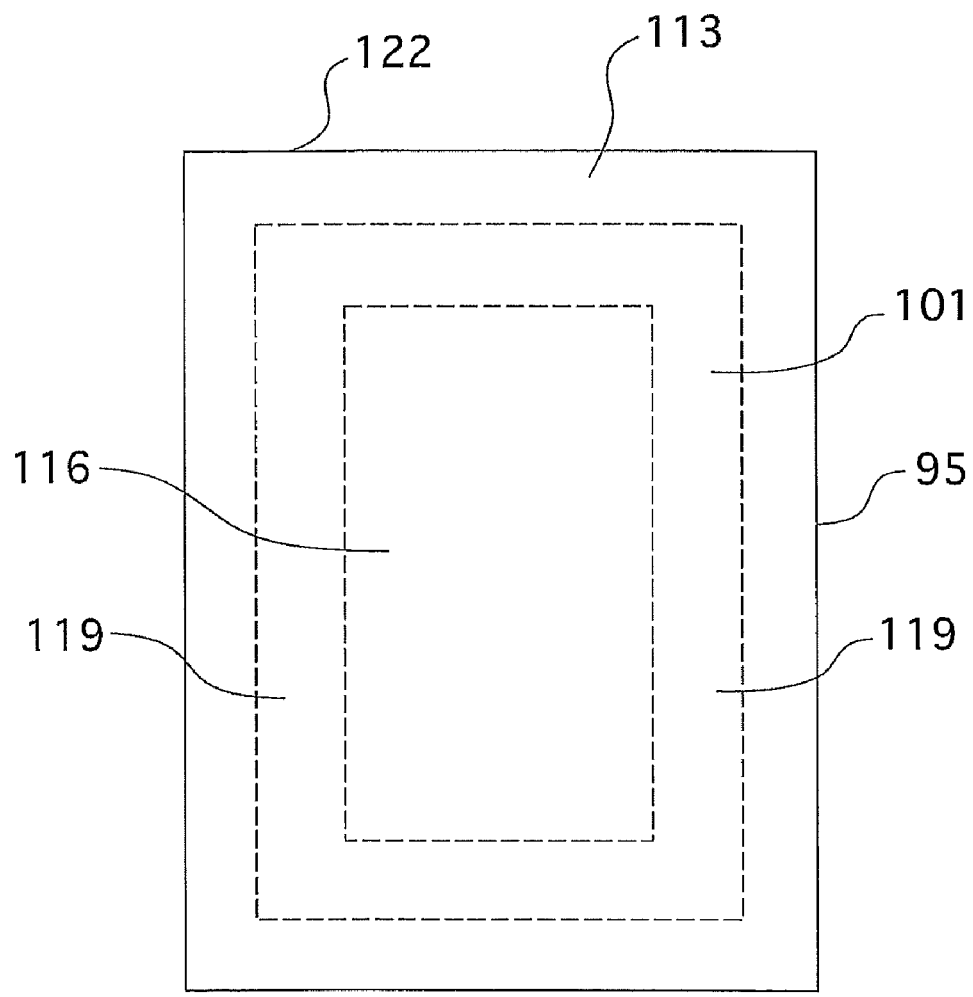
FIG. 9 is a representative plan view of the second surface of a heated thermoplastic sheet that is formed and used in the method of the present invention.

The second surface 101 of the heated thermoplastic sheet is described with regard to the present invention as having a first portion, a second portion, and a third portion. For purposes of illustration, and with reference to FIG. 9, first portion 113 of second surface 101 of heated thermoplastic sheet 95 is located generally near or towards the terminal edges 122 of sheet 95. Second portion 116 of second surface 101 is located generally in a central area of heated thermoplastic sheet 95. Third portion 119 of second surface 101 is located generally in an area between (e.g., interposed between) first portion 113 and second portion 116 of heated thermoplastic sheet 95.

A first portion of the second surface of the heated thermoplastic sheet is contacted with a portion of the exterior surface of at least one tubular sheet retainer. Typically, as the heated thermoplastic sheet is formed, it is sequentially contacted with portions of the exterior surfaces of the tubular sheet retainers.

Reduced pressure is drawn through at least some of the plurality of perforations 41 of exterior surface 38 (e.g., by means of second vacuum apparatus 68 and conduit 71), so as to retain the first portion of the second surface of the heated thermoplastic sheet on the exterior surface of each tubular sheet retainer. The reduced pressure may be drawn through perforations 41 while the first portion of the second surface of the heated thermoplastic sheet is sequentially contacted with the exterior surface of each tubular sheet retainer, so as to sequentially retain the heated thermoplastic sheet on the exterior tubular sheet retainer surface as it is sequentially contacted there-with. Alternatively, the reduced pressure may be drawn through perforations 41 after all of the first portion of the second surface of the heated thermoplastic sheet is contacted with the exterior surfaces of the tubular sheet retainers.

A second portion (e.g., second portion 116) of the second surface (101) of the heated thermoplastic sheet (95) is contacted with at least a portion of the interior mold surface (e.g., 14) of the first mold portion (e.g., 11). Contact of the second portion of the second surface of the heated thermoplastic sheet with at least a portion of the interior mold surface of the first mold portion, may occur prior to, concurrently with or subsequently contact (or reduced pressure retention) of the first portion of the second surface of the heated thermoplastic sheet with/on the exterior surfaces of the tubular sheet retainers. In an embodiment of the present invention, contact of the second portion of the second surface of the heated thermoplastic sheet with at least a portion of the interior mold surface of the first mold portion, occurs substantially concurrently with contact (or reduced pressure retention) of the first portion of the second surface of the heated thermoplastic sheet with/on the exterior surfaces of the tubular sheet retainers Prior to, concurrently with or subsequent to contact of the second portion of the second surface of the heated thermoplastic sheet with at least a portion of the interior mold surface of the first mold portion, the tubular sheet retainers are independently rotated about their longitudinal axes, and moved along the x-, y- and/or z-axis relative to the perimeter edge of the first mold portion. More particularly, with the first portion of the second surface of the heated thermoplastic sheet retained on at least a portion of the exterior surface of each tubular sheet retainer: (i) each tubular sheet retainer is independently rotated around its longitudinal axis towards and/or away from the perimeter edge of the first mold portion; and (ii) each tubular sheet retainer is independently moved towards and/or away from the perimeter edge along the x-, y- and/or z-axes. Rotation and movement of the tubular sheet retainers along x-, y- and/or z-axes may be performed sequentially as recited, substantially concurrently, or sequentially in reverse of the recited order (i.e., rotation occurring after movement along the x-, y- and/or z-axes).

In an embodiment, the tubular sheet retainers are moved in unison along the z-axis towards (e.g., down towards) the perimeter edge. The tubular sheet retainers, with the heated thermoplastic sheet retained thereon, may be moved along the z-axis so as to be positioned below the perimeter edge of the first mold portion.

With at least a portion of the second portion of the second surface of the heated thermoplastic sheet in contact with at least a portion of the interior mold surface of the first mold portion, reduced pressure is drawn (e.g., by means of first vacuum apparatus 29 and conduit 32) through the plurality of perforations (e.g., 26) of the interior mold surface. The second portion of the second surface of the heated thermoplastic sheet is drawn (as a result of the reduced pressure) into intimate contact with and matches the contour of the interior mold surface.

The interior mold surface of the first mold portion may optionally be heated so as to assist matching of the second portion of the second surface of the heated thermoplastic sheet with the contoured interior mold surface. As a result of, however, the residual heat retained within the heated thermoplastic sheet (due to its use upon formation, e.g., upon exiting the sheet die), separately heating the interior mold surface of the first mold portion is typically not required in the method of the present invention. In addition, in light of the residual heat retained within the heated thermoplastic sheet, separate or external heating of the heated thermoplastic sheet is typically not required in the method of the present invention.

While maintained in intimate contour matching contact with the interior mold surface, the heated thermoplastic sheet is cooled. Cooling of the heated thermoplastic sheet results in the formation of a shaped thermoplastic sheet that retains the contour of the interior mold surface of the first mold portion. The heated thermoplastic sheet is typically cooled to a temperature that is less than the softening point or glass transition temperature of the thermoplastic sheet. When cooled to a temperature below its softening point or glass transition temperature, the thermoplastic sheet is no longer thermoformable, and as such will retain the contoured shape of the interior mold surface.

Cooling of the heated and molded/shaped thermoplastic sheet may be achieved by known means. For example, cool air may be passed over the first surface of the heated thermoplastic sheet, and/or the interior mold surface of the first mold portion may be cooled (e.g., by means of a chilled fluid or coolant being passed through conduits located under the interior mold surface of the first mold portion—not shown). Alternatively, or in addition to such cooling methods, a chilled liquid, such as water (e.g., having a temperature of greater than 0° C. and less than or equal to 25° C.) may be contacted directly (e.g., by misting/atomizing) with at least a portion of the first surface of the heated and molded/shaped thermoplastic sheet.

After the thermoplastic sheet has been sufficiently cooled, the resulting shaped thermoplastic sheet (or molded article) is removed from the first mold portion. Removal of the shaped thermoplastic sheet from the first mold portion may be achieved by art-recognized methods. For example, one or more ejector cores may extend reversibly outward from the interior mold surface, in effect pushing the shaped thermoplastic sheet off of and away from the first mold portion. Alternatively, or in addition thereto, a gas (e.g., air) may be passed under pressure through the plurality of perforations (e.g., 26) in the interior mold surface, thereby lifting the shaped thermoplastic sheet off of and away from the first mold portion. Still further alternatively, or in addition thereto, the shaped thermoplastic sheet may be removed from the first mold portion by moving the sheet retainers (with the thermoplastic sheet retained thereon) and the first mold portion away from each other. For example, the sheet retainers with the excess thermoplastic sheet material retained therein, may be moved along the z-axis up and away from the first mold portion, thereby lifting the shaped thermoplastic sheet off of the first mold portion.

The excess portion of the thermoplastic sheet extending from the perimeter edge of the first mold portion to and around at least a portion of the tubular sheet retainers, is typically detached along the perimeter edge after the heated thermoplastic sheet has been drawn by reduced pressure into intimate contour matching contact with the interior mold surface of the first mold portion. The excess thermoplastic sheet material which may be detached prior to or after the shaped thermoplastic sheet is removed from the first mold portion. Typically, the excess thermoplastic sheet material is detached prior to removal of the shaped thermoplastic sheet from the first mold portion.

The excess thermoplastic sheet material may optionally be detached after the shaped thermoplastic sheet is removed from the first mold portion. The excess thermoplastic sheet material may, for example, be used to secure and transport the shaped thermoplastic sheet during post-molding operations, such as sanding, applying labels, cutting holes, inserting attachments and/or painting. After completion of the post molding operations, the excess thermoplastic sheet material may then be detached from the shaped thermoplastic sheet.

Rotation and movement of the tubular sheet retainers along the x-, y- and/or z-axes (with the heated thermoplastic sheet retained thereon) in the method of the present invention assists and enhances the intimate contour matching contact of the second portion of the second surface of the heated thermoplastic sheet with the interior mold surface of the first mold portion.

Figure 5:
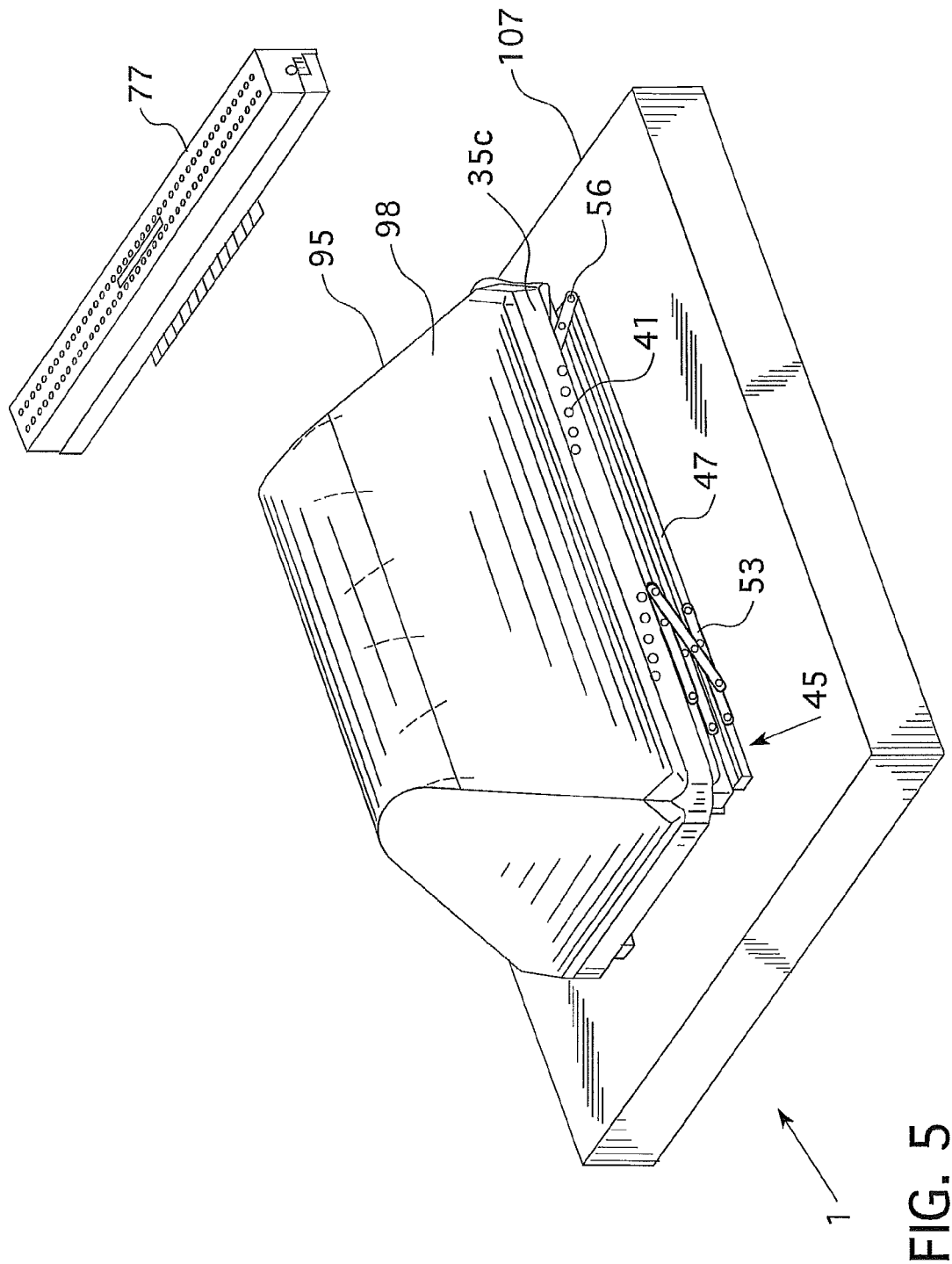
FIG. 5 is a representative perspective view of the sheet molding apparatus of FIG. 4, in which the tubular sheet retainers have been moved downward with the heated thermoplastic sheet retained thereon by means of reduced pressure drawn through the perforations of the tubular sheet retainers.
Figure 6:
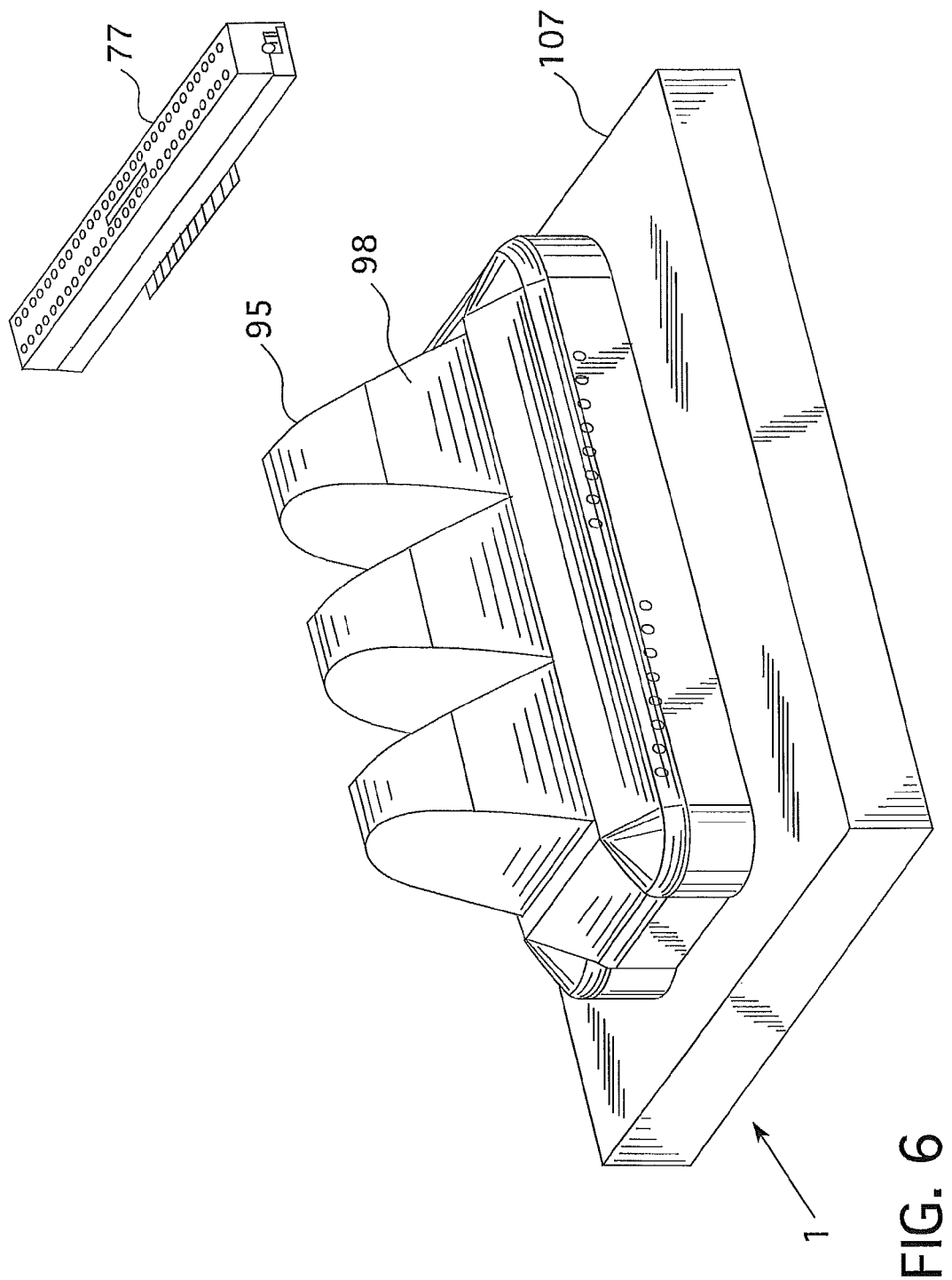
FIG. 6 is a representative perspective view of the sheet molding apparatus of FIG. 5 in which the heated thermoplastic sheet has been drawn by reduced pressure into contact with the interior surface of the first mold portion, and the tubular sheet retainers have been rotated outward relative to the perimeter edge of the first mold portion.

For example, as depicted in FIG. 5, when the scissor jack apparatuses 45 are collapsed and the tubular sheet retainers drop down (with the heated thermoplastic sheet retained thereon via reduced pressure) along the z-axis towards and past the perimeter edge 17 (not visible in FIG. 5), the heated thermoplastic sheet 95 is draped over substantially the entire interior mold surface 14 of first mold portion 11. With heated thermoplastic sheet 95 so draped, drawing reduced pressure through the perforations 26 in interior mold surface 14 efficiently draws the second portion (e.g., 116) of the second surface 101 of heated thermoplastic sheet 95 into intimate contour matching contact with interior mold surface 14. See, for example, FIG. 6.

Rotation of the tubular sheet retainers serves in part to assist with controlling the thickness of the heated thermoplastic sheet as it is drawn down by reduced pressure into intimate contour matching contact with interior mold surface 14. In particular, rotating of the tubular sheet retainers provides for the formation of a shaped thermoplastic sheet that has a more uniform thickness, than would be obtained in the absence of rotating tubular sheet retainers. For example, rotating the tubular sheet retainers outward or away from the perimeter edge may serve to, in part, prevent bunching or gathering of heated thermoplastic sheet material on the interior mold surface, which can lead to non-uniform sheet thicknesses in the final molded article. Rotating the tubular sheet retainers outward or away from the perimeter edge is typically (though not exclusively) advantageous when the first mold portion has a male interior mold surface, the majority of which extends above (or outward from) the perimeter edge (as depicted in the drawings).

Rotating the tubular sheet retainers inward or towards the perimeter edge may serve to, in part, prevent over-stretching or thinning resulting from too little heated thermoplastic sheet material being drawn down onto the interior mold surface. For example, as the tubular sheet retainers are rotated toward the perimeter edge, more heated thermoplastic material is made available to be drawn down onto the interior mold surface. Rotating the tubular sheet retainers inward or towards the perimeter edge is typically (though not exclusively) advantageous when the first mold portion has a female interior mold surface, the majority of which is recessed below the perimeter edge (not depicted in the drawings).

In the case of a first mold portion having a complex interior mold surface, for example, having portions that may be characterized as male, and other portions that may be characterized as female, some tubular sheet retainers may be rotated towards the perimeter edge, while other tubular sheet retainers are rotated away from the perimeter edge. For example, those tubular sheet retainers that are adjacent to male interior mold surface portions, may be rotated away from the perimeter edge; while those tubular sheet retainers that are adjacent to female interior mold surface portions, may be rotated towards the perimeter edge.

As the heated thermoplastic sheet drops vertically and gravitationally from the sheet die, it may be subject to necking, which causes the width of the heated thermoplastic sheet to decrease. For purposes of illustration, and with reference to FIG. 10, heated thermoplastic sheet 95 is depicted as exhibiting the phenomenon of necking. As heated thermoplastic sheet 95 drops through vertical distance 137, a pre-necked portion 125 having an initial width 131 is formed. After heated thermoplastic sheet 95 drops further through vertical distance 140, the phenomenon of necking occurs and a transition portion 127 is formed having a variably decreasing width. After falling through distance 140, the necking phenomenon is complete and a necked portion 128 having a stabilized width of 134 is formed. Width 134 of necked portion 128 is smaller than width 131 of initial portion 125 of heated thermoplastic sheet 95. The width of the transition portion 127 is typically less than width 131 of initial portion 125, and greater than width 134 of necked portion 128 of the heated thermoplastic sheet.

The phenomenon of sheet necking may have numerous causes, including but not limited to, the molten thermoplastic composition, the configuration of the sheet die (e.g., the shape of its slot), the temperature of the heated thermoplastic sheet as it emerges from the sheet die, and combinations thereof. The phenomenon of necking is typically undesirable, since the resulting reduction in the width of the heated thermoplastic sheet usually necessitates the use of a wider, heavier and more expensive sheet die.

Figure 10:
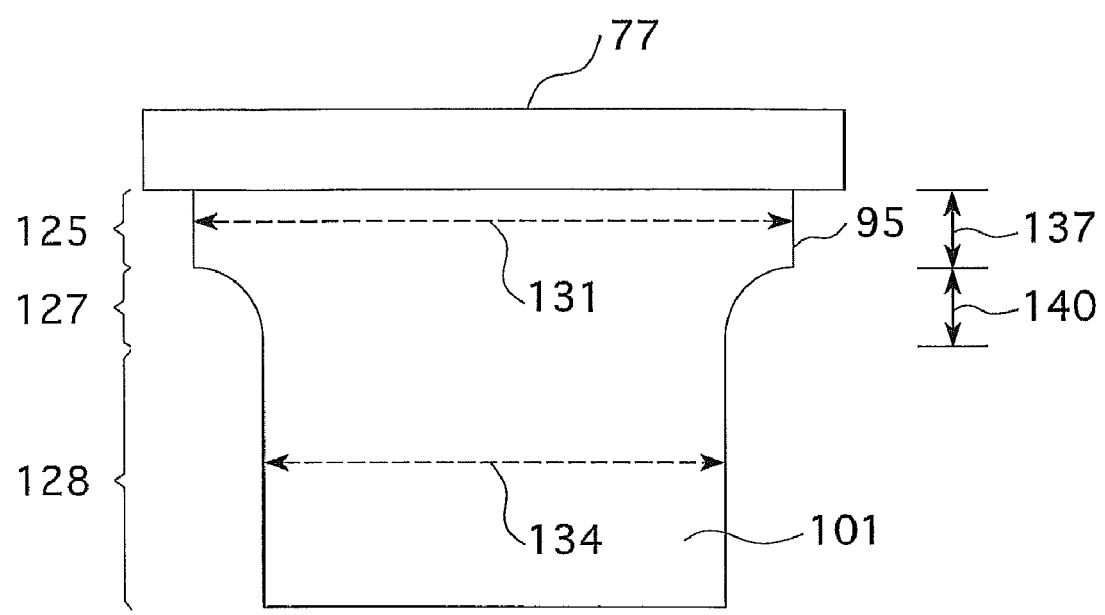
FIG. 10 is a representative elevational view of the second surface of a heated thermoplastic sheet as it emerges from the sheet die, in which the heated thermoplastic sheet exhibits necking.

In an embodiment of the present invention, the step of contacting the first portion of the second surface of the heated thermoplastic sheet with at least a portion of the exterior surface of each tubular sheet retainer occurs prior to necking of the heated thermoplastic sheet. Retaining the heated thermoplastic sheet on the exterior surface of the tubular sheet retainer prior to necking, substantially prevents necking of the heated thermoplastic sheet. With further reference to FIG. 10, for example, when the first portion of the second surface 101 of heated thermoplastic sheet 95 is contacted with and retained on at least a portion of the exterior surface 38 of a tubular sheet retainer 35 within vertical distance 137 (i.e., before necking occurs), necking of the heated thermoplastic sheet is substantially prevented, and the heated thermoplastic sheet retains its initial (non-necked) width 131.

As discussed previously with regard to the sheet molding apparatus, in an embodiment of the method of the present invention, the first mold portion and the tubular sheet retainers are together positioned and moveable in a plane (e.g., the plane defined by the x- and y-axes of FIG. 1) beneath the sheet die, and the sheet die is substantially stationary. The first mold portion 11 and the tubular sheet retainers 35 may both reside on a platform 107 that is moveable within the plane beneath sheet die 77, in accordance with the description previously provided herein. In this embodiment, the method further includes moving the first mold portion and the tubular sheet retainers together in the plane beneath the sheet die as the thermoplastic sheet is formed, thereby facilitating contact between the heated thermoplastic sheet and the exterior surface of each tubular sheet retainer and the interior mold surface of the first mold portion. As the first mold portion and tubular sheet retainers are moved beneath the sheet die, the heated thermoplastic sheet is in effect draped there-across. See, for example, FIGS. 1 through 4. With reference to FIG. 3, the linear speed at which the first mold portion 11 and tubular sheet retainers 35 are moved beneath sheet die 77 (e.g., on platform 107 in the direction indicated by arrow 143), and the rate at which heated thermoplastic sheet 95 is produced from sheet die 77, may together be controlled so as to control the thickness of the heated thermoplastic sheet 95 as it is draped across the mold and tubular sheet retainers. The rate of linear movement and rate of heated thermoplastic sheet formation may each be variably and independently controlled so as to vary the thickness of the heated thermoplastic sheet across the interior mold surface.

Figure 4:
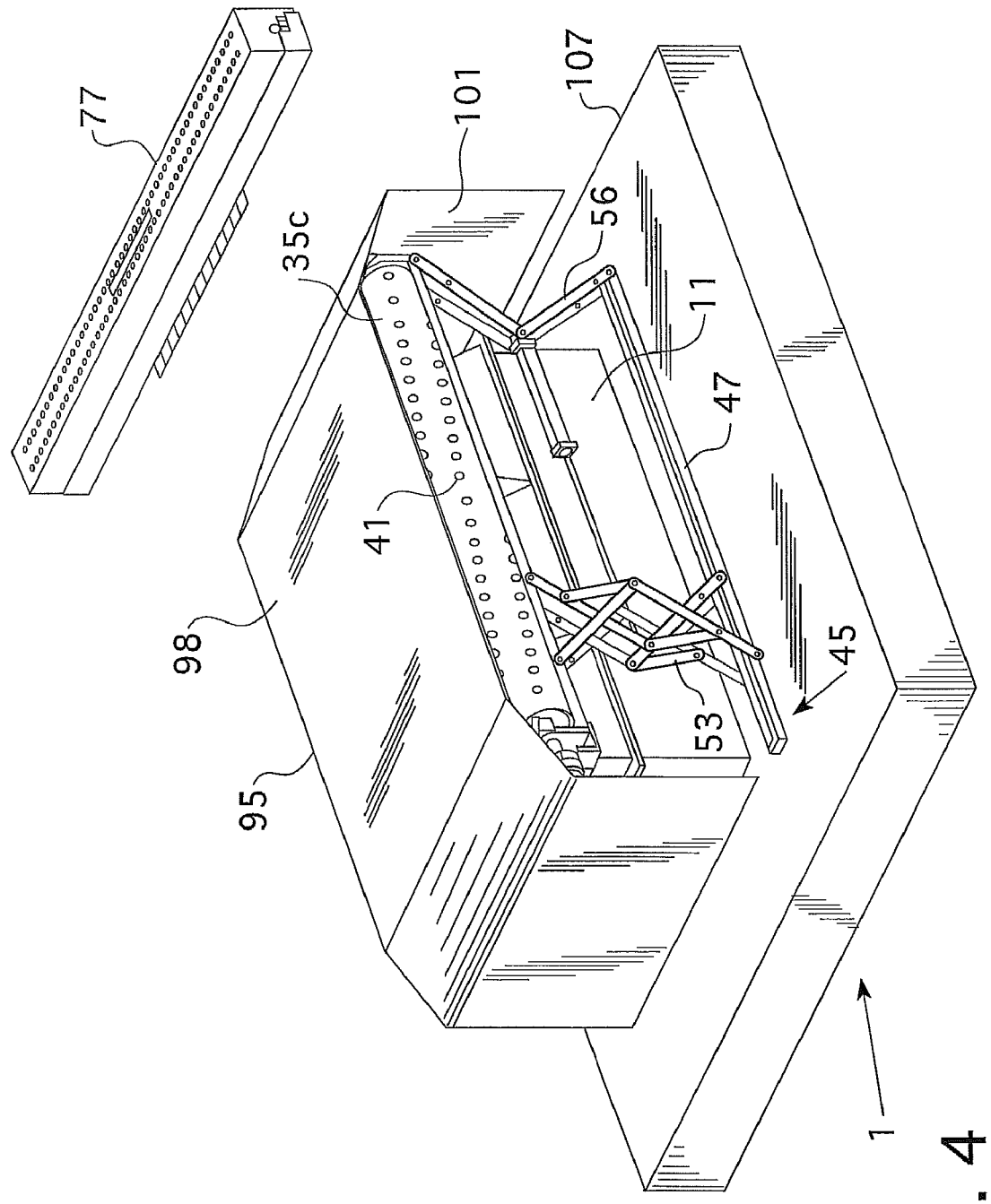
FIG. 4 is a representative perspective view of the sheet molding apparatus of FIG. 3, in which the heated thermoplastic sheet has been separated from the sheet die and drapes over the first mold portion and the tubular sheet retainers.

In FIGS. 3 and 4, for purposes of clarity, heated thermoplastic sheet 95 is depicted as being rigid, so as to provide a view of the underlying tubular sheet retainer 35c. Since heated thermoplastic sheet 95 has a temperature that is at least greater than its softening point, in practice heated thermoplastic sheet 95 more typically drapes across a portion of interior mold surface 14 and/or at least one tubular sheet retainer 35 (rather than rigidly residing there-over and/or thereon).

In the method of the present invention, the heated thermoplastic sheet is typically detached from the sheet die at some point after it has been draped across the interior mold surface and tubular sheet retainers, and before the shaped thermoplastic sheet is removed from the first mold portion. In an embodiment, the method includes detaching the heated thermoplastic sheet from the sheet die prior to, concurrently with or after the step of: (i) rotating each tubular sheet retainer around its longitudinal axis independently towards and/or away from the perimeter edge; and (ii) moving each tubular sheet retainer independently towards and/or away from the perimeter edge along the x-, y- and/or z-axes. With reference to FIG. 4, heated thermoplastic sheet 95 has been detached from sheet die 77 prior to rotating and moving the tubular sheet retainers along the x-, y- and/or z-axes.

The sheet molding apparatus of the present invention may further include a second mold portion having an interior mold surface, in which case, the method may further include the step of contacting compressively the interior mold surface of the second mold portion with the first surface of the heated thermoplastic sheet. Contact of the interior mold surface of the second mold portion with the first surface of the heated thermoplastic sheet, is performed: (i) after the second portion of the second surface of the heated thermoplastic sheet has been drawn into intimate contour matching contact with the interior mold surface of the first mold portion (by means of reduced pressure drawn through the perforations of the interior mold surface of the first mold portion); and (ii) before cooling of the heated thermoplastic sheet (and the corresponding formation of the shaped thermoplastic sheet).

Figure 11:
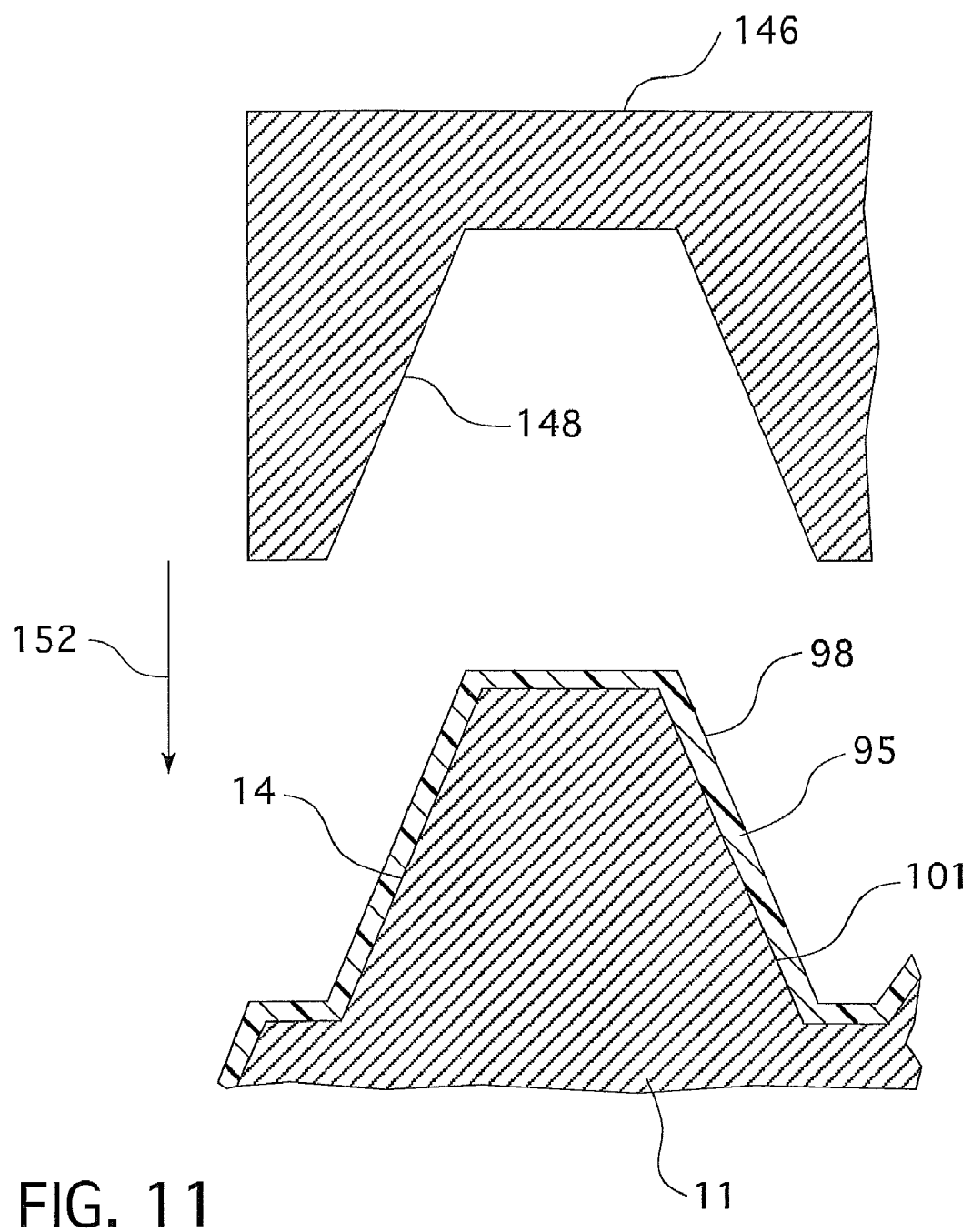
FIG. 11 is a partial side sectional view of the mold apparatus as depicted in FIG. 6, further including a second mold portion.

With reference to FIG. 11, second mold portion 146 has an interior mold surface 149. First mold portion 11 and second mold portion 146 are reversibly positionable relative to each other (e.g., along arrow 152), such that interior mold surface 14 of first mold portion 11 and interior mold portion 149 of second mold portion 146 are in reversibly positionable facing opposition relative to each other. More particularly, first surface 98 of heated thermoplastic sheet 95 and interior mold portion 149 of second mold portion 146 are in reversibly positionable facing opposition relative to each other (as depicted). When second mold portion 146 is moved in the direction represented by arrow 152 towards first mold portion 11, interior mold surface 149 of second mold portion 146 compressively contacts first surface 98 of heated thermoplastic sheet 95. Second mold portion 146 may be moved by known means, such as on vertical rails by means of a piston (not shown). Second mold portion 146 is typically located at a remote compression molding station relative to the heated thermoplastic sheet formation station (where sheet die 77 is located). Generally, platform 107 is moved by known locomotion means (e.g., on rails, as described previously herein) to the remote compression molding station, and second mold portion 146 is brought into compressive contact with first surface 98 of heated thermoplastic sheet 95.

Interior mold surface 149 of second mold portion 146 is typically brought into compressive contact with first surface 98 of heated thermoplastic sheet 95 at a compressive force of 1.0 Kg/cm$^2$ to 4.0 Kg/cm$^2$ (14 to 57 psi), more typically from 1.2 Kg/cm$^2$ to 2.0 Kg/cm$^2$ (17 to 28 psi), and further typically from 1.3 Kg/cm$^2$ to 1.8 Kg/cm$^2$ (19 to 27 psi). In an embodiment, interior mold surface 149 of second mold portion 146 is typically brought into compressive contact with first surface 98 of heated thermoplastic sheet 95 at a compressive force of 1.5 Kg/cm$^2$ (21 psi).

Contact of the interior mold surface of the second mold portion with the first surface of the heated thermoplastic sheet may be undertaken for reasons including, but not limited to: imparting surface features into the first surface of the heated thermoplastic sheet; controlling the thickness of the sheet; and/or smoothing the first surface of the sheet. The interior mold surface of the second mold portion may be smooth, or it may include raised and/or recessed portions.

Certain of the various steps of the method of the present invention, as discussed previously herein, may be performed sequentially as recited, concurrently, or in reverse order. In an embodiment of the present invention, the following steps are performed substantially sequentially as recited: (d) contacting the first portion of the second surface of the heated thermoplastic sheet with at least a portion of the exterior surface of the tubular sheet retainer; (e) drawing reduced pressure through the plurality of perforations of the exterior surface of the tubular sheet retainer, thereby retaining the first portion of the second surface of the heated thermoplastic sheet on the exterior surface of the tubular sheet retainer; (f) contacting the second portion of the second surface of the heated thermoplastic sheet with at least a portion of the interior mold surface of the first mold portion; and (g)(i) rotating each tubular sheet retainer, around its longitudinal axis, independently towards and/or away from the perimeter edge, and (g)(ii) moving each tubular sheet retainer independently towards and/or away from the perimeter edge, in each case independently along the x-, y- and/or z-axes.

In a further embodiment of the present invention, the step of: (h) drawing reduced pressure through the plurality of perforations of the interior mold surface of the first mold portion (such that the second portion of the second surface of said heated thermoplastic sheet substantially matches the contour of the interior mold surface of said first mold portion); is performed concurrently or sequentially with the step of, (g)(i) rotating each tubular sheet retainer, around its longitudinal axis, independently towards and/or away from the perimeter edge, and (g)(ii) moving each tubular sheet retainer independently towards and/or away from the perimeter edge, in each case independently along the x-, y- and/or z-axes.

The steps of (f) contacting the second portion of the second surface of the heated thermoplastic sheet with at least a portion of the interior mold surface of the first mold portion, and the step(s) (g) of moving each sheet retainer relative to the mold perimeter edge, may be performed sequentially as recited, substantially concurrently, or in reverse order. For example, in an embodiment, the step of (g)(i) rotating each tubular sheet retainer, around its longitudinal axis, independently towards and/or away from the mold perimeter edge, and (g)(ii) moving each tubular sheet retainer independently towards and/or away from the mold perimeter edge, in each case independently along the x-, y- and/or z-axes; is performed prior to (e.g., sequentially prior to) the step of (f) contacting the second portion of the second surface of the heated thermoplastic sheet with at least a portion of the interior mold surface of the first mold portion.

In the method of the present invention, the step of drawing the second portion of the second surface of the heated thermoplastic sheet into intimate contoured contact (via reduced pressure) with the interior mold surface of the first mold portion may be assisted or enhanced by forming a seal between the second surface of the heated thermoplastic sheet and the perimeter edge of the first mold portion. In particular, a third portion (e.g., third portion 119 of FIG. 9) of the second surface of the heated thermoplastic sheet is contacted with the perimeter edge (and in particular the entire perimeter edge), thereby forming a seal between the third portion and the perimeter edge. After or concurrently with formation of the sheet-perimeter edge seal, the step of drawing reduced pressure through the perforations (e.g., 26) of the interior surface (e.g., 14) of the first mold portion may then be undertaken. A vacuum or near vacuum may be formed in the enclosed/sealed space defined by the second portion of the second surface of the heated thermoplastic sheet and the interior mold surface, as reduced pressure is drawn through the perforations of the interior mold surface. The formation of the vacuum or near vacuum, thus results in the heated thermoplastic sheet being efficiently drawn down onto the interior mold surface.

When the first portion of the second surface of the heated thermoplastic sheet is retained (by reduced pressure) on a portion of the exterior surface of the tubular sheet retainers, it is desirable to prevent the heated thermoplastic sheet from wrapping all the way around the tubular sheet retainer. If wrap-around occurs, removal of the thermoplastic sheet material from the tubular sheet retainer may be difficult, rendering the sheet molding apparatus inoperable (at least until the thermoplastic sheet material is removed). To prevent wrap-around, the tubular sheet retainers may be fitted with doctor blades (not shown) at certain points (e.g., at the horizontal midpoint of each tubular sheet retainer) that serve to separate the heated thermoplastic sheet material from the exterior surface as the tubular sheet retainers are rotated.

In an embodiment, the tubular sheet retainer 35 has an upper tubular zone and a lower tubular zone. When a first portion of the plurality of said perforations of the exterior surface of the tubular sheet retainer reside in the upper tubular zone, reduced pressure is drawn in through the first portion of the plurality of perforations residing in the upper tubular zone. Concurrently, when a second portion of the plurality of the perforations of the exterior surface of the tubular sheet retainer reside in the lower tubular zone, a gas at elevated pressure is pushed out through the second portion of the plurality of perforations residing in the lower tubular zone. The differential pressures between the upper and lower tubular zones results in: the heated thermoplastic sheet being retained on the upper tubular zone; while at the same time retention of the heated thermoplastic sheet on the lower tubular zone is substantially minimized.

To achieve the differential pressures between upper and lower tubular zones, the sheet molding apparatus of the present invention is provided with at least one tubular sheet retainer having at least one internal and stationary upper longitudinal chamber located in the upper tubular zone, and at least one internal and stationary lower longitudinal chamber located in the lower tubular zone. Reduced pressure is drawn through the upper longitudinal chamber(s), while a gas (e.g., air) is introduced at elevated pressure into the lower longitudinal chamber(s).

Figure 8:
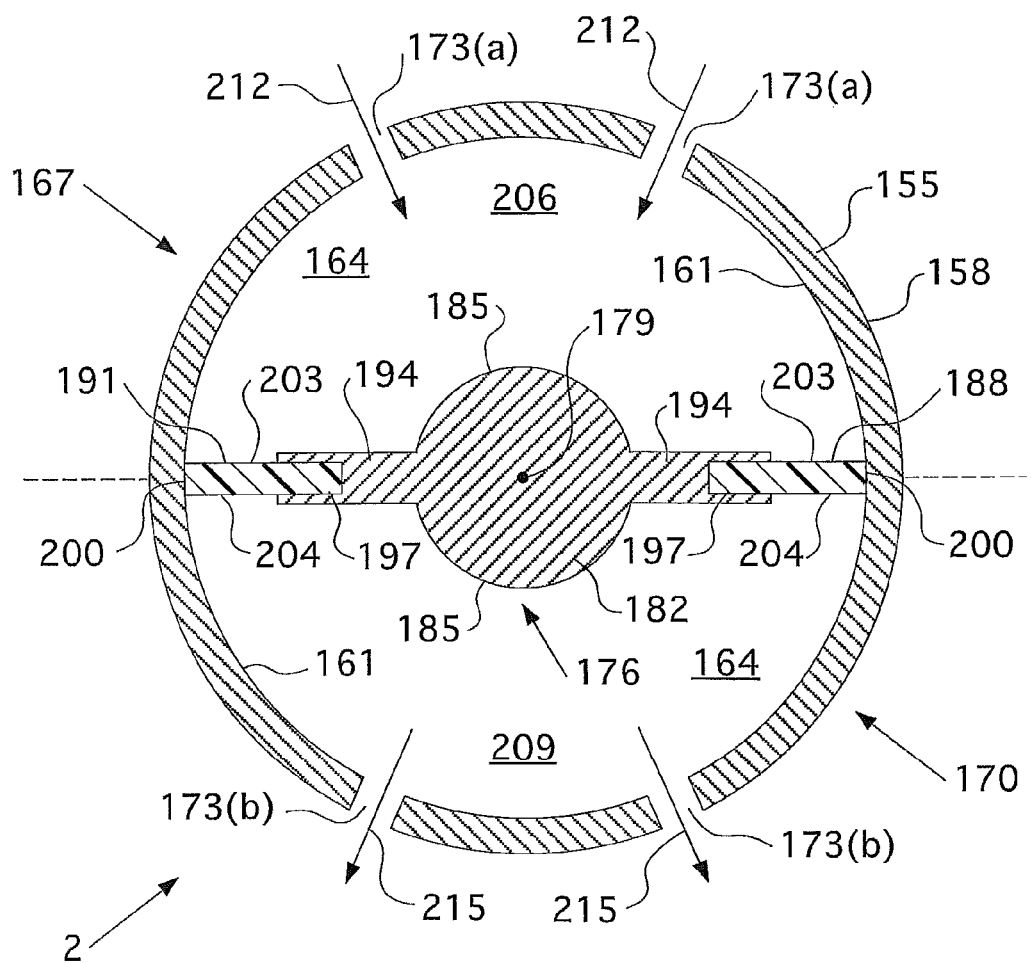
FIG. 8 is a representative sectional view of a tubular sheet retainer according to the present invention that includes two separate internal longitudinal chambers.

With reference to FIG. 8, tubular sheet retainer 2 includes an outer tube 155 having an exterior surface 158 and an interior surface 161 that defines an interior tubular space 164. Tubular sheet retainer 2 has an upper tubular zone 167 and a lower tubular zone 170. Outer tube 155 (and more particularly outer surface 158 thereof) has a plurality of perforations 173, a first portion of which 173(a) reside in upper tubular zone 167, and a second portion of which 173(b) reside in lower tubular zone 170. Perforations 173 provide fluid communication with interior tubular space 164.

Tubular sheet retainer 2 further includes a seal apparatus 176 that extends longitudinally through interior tubular space 164. Seal apparatus 176 is stationary, while outer tube 155 is rotatable around seal apparatus 176. Typically, the longitudinal axis of outer tube 155 and the longitudinal axis of seal apparatus 176 are substantially aligned, as depicted by longitudinal axis 179 of tubular sheet retainer 2 in FIG. 8.

Seal apparatus 176 includes a seal support 182 having an exterior surface 185, and at least two seals 188 and 191 extending radially outward from exterior surface 185. Seal support 182 extends longitudinally through interior tubular space 164. Seal support 182 may include brackets 194 extending radially outward from its exterior surface 185 that include longitudinal recesses 197 that provide support for seals 188 and 191. Seals 188 and 191 extend radially outward from the respective longitudinal recess 197 of the bracket 194 in which they are supportively received.

Each seal (188, 191) has a terminal radial surface 200 and sidewalls 203 and 204. The terminal radial surface 200 of each seal (188, 191) abuts sealingly with interior surface 161 of outer tube 155. Each pair of neighboring seals (e.g., 188 and 191) have facing (or neighboring) sidewalls (e.g., 203-203, and 204-204). Each pair of facing/neighboring sidewalls (203-203, and 204-204) together with the interior surface 161 of outer tube 155 and a portion of exterior surface 185 of seal support 182 residing between the neighboring seals together (and at least in part) define a longitudinal chamber (206, 209). Tubular sheet retainer 2, accordingly includes at least two longitudinal chambers (206 and 209). The longitudinal chambers/passages may also be further defined (in part) by the exterior surfaces (or sidewalls) of the brackets 194 extending radially outward from seal support 182.

Since seal apparatus 176 is stationary, at least one longitudinal chamber resides in upper tubular zone 167 and is an upper longitudinal chamber 206, while at least one longitudinal chamber resides in lower tubular zone 170 and is a lower longitudinal chamber 209. With the internal longitudinal chambers so situated, each upper longitudinal chamber 206 may independently have reduced pressure drawn therefrom (e.g., by means of a vacuum apparatus attached to a port in a terminal plate—not shown). And correspondingly, each lower longitudinal chamber 209 may independently have a gas (e.g., air) introduced therein at elevated pressure (e.g., by means of a pressure pump attached to a port in a terminal plate—not shown).

As outer tube 155 is rotated around seal support apparatus 176, some of perforations 173 of outer tube 155 come to reside in upper tubular zone 167, and accordingly are (or become) the first portion of perforations 173(a), while residing in upper tubular zone 167. First portion of perforations 173(a) residing in upper tubular zone 167 are in fluid communication with upper longitudinal chamber 206, and accordingly reduced pressure is drawn through at some of first portion of perforations 173(a) and into upper longitudinal chamber 206, as represented by arrows 212.

As outer tube 155 is rotated around seal support apparatus 176, some of perforations 173 of outer tube 155 come to reside in lower tubular zone 170, and accordingly are (or become) the second portion of perforations 173(b), while residing in lower tubular zone 170. Second portion of perforations 173(b) residing in lower tubular zone 170 are in fluid communication with lower longitudinal chamber 209, and accordingly a gas (e.g., air) at elevated pressure is passed from lower longitudinal chamber 209 out through second portion of perforations 173(b), as represented by arrows 215.

Seal support 182 may be fabricated from any suitable rigid material, such as metals, thermoplastic materials, thermosetting materials, ceramic materials and combinations thereof. The seals (e.g., 188 and 191) of seal support apparatus 176 may be fabricated from any suitable resilient material, such as elastomeric plastic materials.

Figure 7:
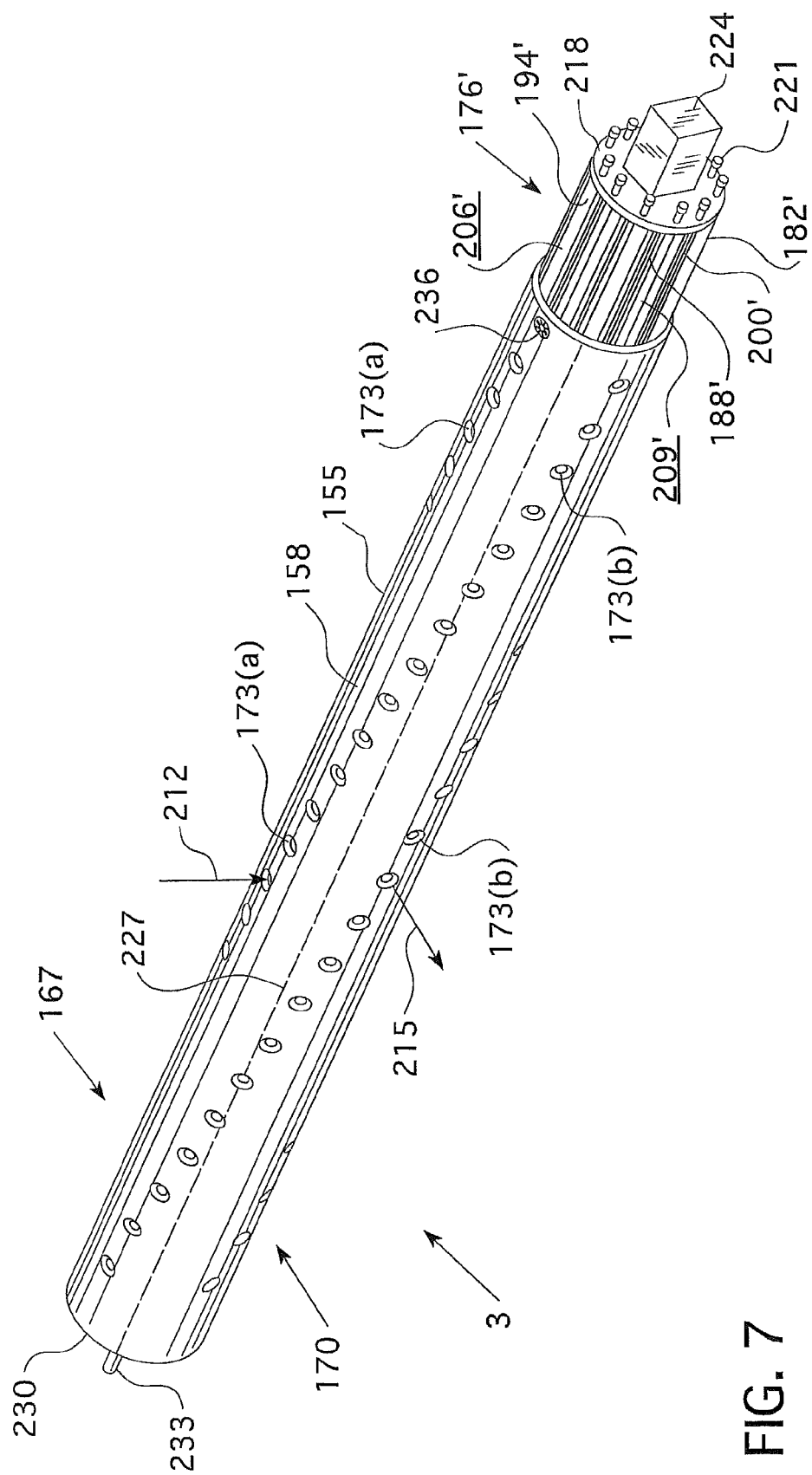
FIG. 7 is a representative perspective and partially exploded view of a tubular sheet retainer according to the present invention that includes a plurality of separate internal longitudinal chambers.

The tubular sheet retainer may include two or more interior longitudinal passages. With reference to FIG. 7, tubular sheet retainer 3 includes a seal apparatus 176' that includes a seal support 182' having a plurality of radial seal support brackets 194' and a plurality of radial seals 188' each having a terminal radial surface 200'. Accordingly, seal apparatus 176' has a plurality of upper longitudinal chambers 206' and a plurality of lower longitudinal chambers 209'. The dividing line between upper longitudinal chambers 206' and lower longitudinal chambers 209' of tubular sheet retainer 3 is depicted in FIG. 7 by dashed line 227. The number of upper longitudinal chambers 206' is substantially equivalent to the number of lower longitudinal chambers 209', with tubular sheet retainer 3. Each upper longitudinal chamber 206', located in upper tubular zone 167, may each independently have reduced pressure drawn therefrom, thereby drawing reduced pressure through the first portion of perforations 173(a) in fluid communication therewith (e.g., as depicted by arrow 212). Accordingly, each lower longitudinal chamber 209', located in lower tubular zone 170, may have a gas (e.g., air) introduced independently therein at elevated pressure, thereby resulting in the gas passing at elevated pressure out through the second portion of perforations 173(b) (e.g., as depicted by arrow 215).

Seal apparatus 176' of tubular sheet retainer 3 includes an endplate 218 having a plurality of retainer bolts 221, and an extension 224 (having a rectangular shape) extending outward therefrom. Extension 224 is received fittingly within a recess of a separate stationary structure (not shown), which results in seal apparatus 176' being held stationary, while outer tube 155 is rotated there-around.

Tubular sheet retainer 3 also includes a second endplate 230 (not visible in FIG. 7) that is positioned at the opposite end of outer tube 155, relative to endplate 218. Second endplate 230 engages both sealingly and attachedly (e.g., via welds) with outer tube 155, so as to provide for rotation of outer tube 155 around seal apparatus 176'. More particularly, second endplate 230 has a shaft 233 extending outwardly therefrom, which may engage with a rotational drive mechanism (not shown) by means of, for example, a sprocket (not shown).

As the perforations 173 of outer tube 155 move from lower tubular zone 170 to upper tubular zone 167, or from upper tubular zone 167 to lower tubular zone 170 (as outer tube 155 is rotated about seal apparatus 176), the perforations may concurrently be in fluid communication with upper longitudinal chamber 206 and lower longitudinal chamber 209, as the perforations pass over the terminal radial surface 200 of a radial seal (e.g., 188 and 191). A single perforation 173 that is in concurrent fluid communication with upper longitudinal chamber 206 and lower longitudinal chamber 209 (e.g., a bridging perforation) results in a phenomenon referred to herein as "lateral crosstalk." The phenomenon of lateral cross-talk generally involves a gas at elevated pressure passing out through a portion of the bridging perforation (from lower longitudinal chamber 209) and being drawn into upper longitudinal chamber 206 through a further portion of the bridging perforation.

Lateral crosstalk between the lower and upper longitudinal chambers through a bridging perforation, is undesirable since such bridging perforations generally neither retain nor limit retention of the heated thermoplastic sheet on exterior surface 158 of outer tube 155. In addition, lateral crosstalk between the lower and upper longitudinal chambers through a bridging perforation, may be further or alternatively undesirable due to the heated thermoplastic material being both drawn down and pushed off of the bridging perforation, which may result in fouling of the bridging perforation (e.g., as the result of thermoplastic material being driven further down into the reduced pressure portion of the bridging perforation).

The phenomenon of lateral crosstalk may be minimized or prevented by selecting the dimensions of the perforations in the exterior surface of the tubular sheet retainer, and the dimensions of the terminal radial surface of the radial seals, such that the bridging perforations are substantially occluded (or blocked) by the terminal radial surface of the radial seals. For example, in the case of perforations 173 of outer tube 155 having substantially circular cross-sections, the width of the terminal radial surface 200 of the radial seal (188, 191) is at least equivalent to the diameter of each perforation 173. With the dimensions so selected, a perforation 173 passing over terminal radial surface 200 of a seal (188, 191) is substantially occluded by the terminal radial seal surface, and lateral crosstalk between the adjacent longitudinal chambers is prevented.

The phenomenon of "longitudinal crosstalk" involves a plurality of perforations in the outer tube of the tubular sheet retainer being substantially longitudinally aligned and in common fluid communication with an underlying longitudinal chamber that has suffered either a pressure withdrawal or pressure input failure (depending on whether the underlying longitudinal chamber is an upper or lower longitudinal chamber). If the underlying longitudinal chamber suffers, for example, a pressure withdrawal failure, all of the perforations aligned and in fluid communication therewith will also be affected by and suffer such a failure, in which case those affected perforations would be effectively dead (e.g., being unable to retain the heated thermoplastic sheet thereon).

In an embodiment of the present invention, the perforations (e.g., 173) of the exterior surface (e.g., 158) of the outer tube (e.g., 155) are arranged in such a manner so as to minimize longitudinal crosstalk. In a particular embodiment, perforations 173 are arranged in a helical pattern in exterior surface 158 of outer tube 155 of tubular sheet retainer 3. See FIG. 7. Arranging perforations 173 in a helical pattern minimizes the number of perforations that are longitudinally aligned and in common fluid communication with an (any one) underlying longitudinal chamber (e.g., 206' or 209'). As such, if a particular longitudinal chamber experiences a pressure (withdrawal or input) failure, a minimum number of perforations passing there-over will be so affected by such failure.

At least some of the perforations of the outer tube of the tubular sheet retainer may have an insert (e.g., a cup insert 236 of FIG. 7) having at least one aperture and an upper cup surface having an outer rim, received therein. The upper cup surface may have any suitable shape (e.g., flat, convex or concave). Each aperture of a cup insert extends through the cup insert and provides a conduit through which reduced pressure may be drawn or a pressurized gas may be expelled. More particularly, each aperture of a cup insert provides fluid communication with an underlying longitudinal chamber of the tubular sheet retainer (through which reduced pressure may be drawn, or a gas at elevated pressure may be introduced). The cup inserts may be used, for example, to enhance retention of the heated thermoplastic sheet on the tubular sheet retainer, while at the same time minimizing fouling of the outer tube perforations with thermoplastic sheet material.

Figure 12:
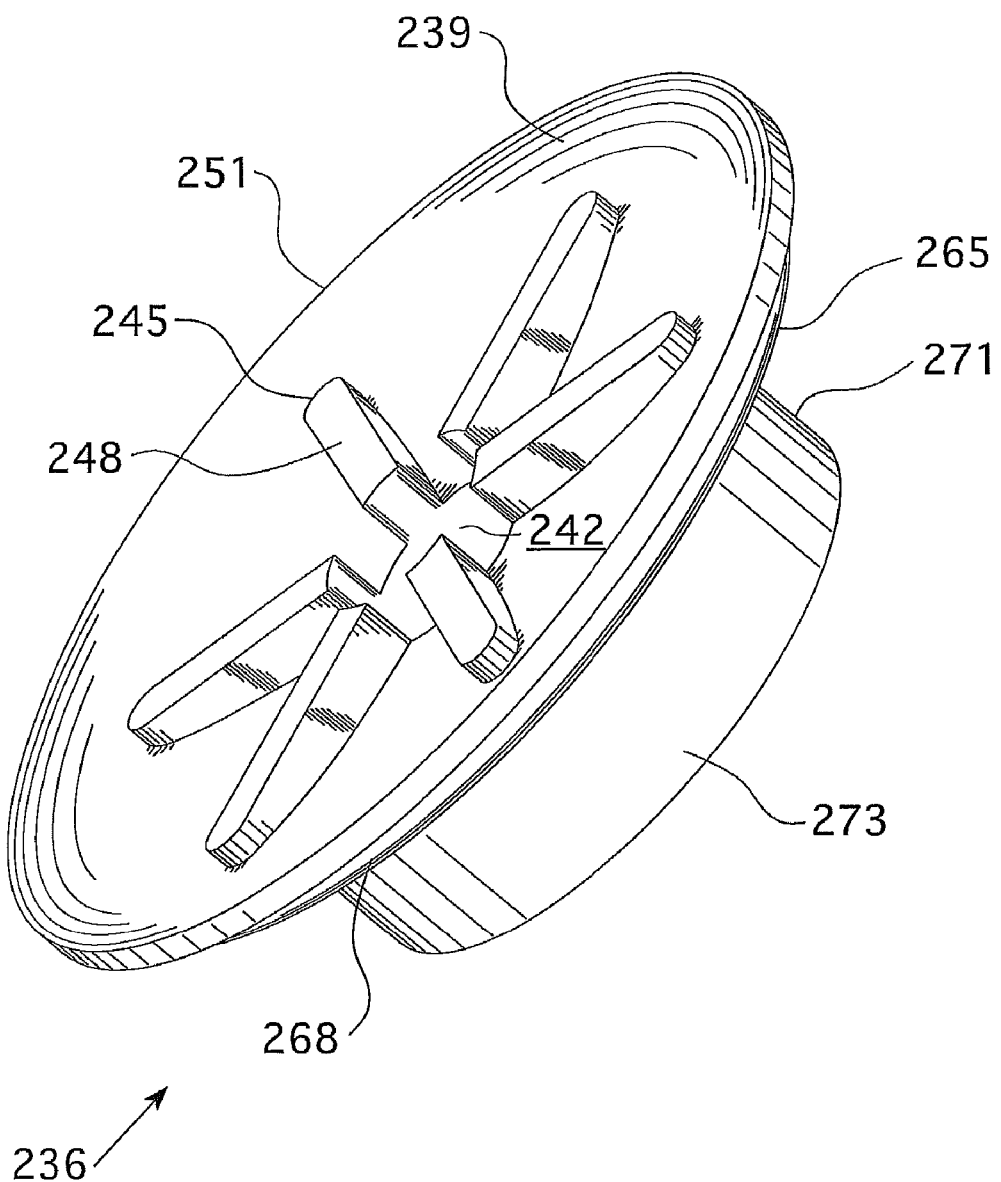
FIG. 12 is a representative perspective view of a cup insert that may be received within the perforations of the tubular sheet retainer.

With reference to FIG. 12, cup insert 236 has an upper cup surface 239 and an aperture 242 extending there-through. Aperture 242 is substantially centrally positioned in upper cup surface 239. The cup insert may further include a plurality of raised ribs (e.g., 245) having upper terminal surfaces (e.g., 248), extending outwardly (or upwardly) from the upper cup surface (e.g., 239). The raised ribs may be arranged randomly or regularly on the upper cup surface. In a particular embodiment, and as depicted in FIG. 12, raised ribs 245 of cup insert 236 are arranged on upper cup surface 239 so as to extend substantially radially outward from (relative to) aperture 242.

Upper cup surface 239, as depicted, is a concave upper cup surface, and also has an outer rim 251. The upper terminal surface (e.g., 248) of each raised rib (e.g., 245) may independently: extend beyond outer rim 251; be substantially level with outer rim 251; or be recessed relative to (i.e., positioned below) outer rim 251. In an embodiment of the present invention, upper cup surface 239 is a concave upper cup surface, and the upper terminal surface 248 of each raised rib 245 is recessed relative to (i.e., is positioned below) outer rim 251.

The cup inserts may be retained within the perforations of the outer tube by suitable means, including for example, adhesives, retaining clips, and/or retaining rings (not shown). Depending on the configuration of the upper cup surface, the upper cup surface and the outer rim thereof may each independently, extend beyond, be substantially level with, or be recessed relative to (positioned below) the exterior surface (e.g., 158) of the outer tube (e.g., 155). In an embodiment, upper cup surface 239 of cup insert 236 is a concave upper cup surface, and each of upper cup surface 239 and outer rim 251 are recessed relative to (i.e., positioned below) exterior surface 158 of outer tube 155, in which case cup insert 236 is a substantially recessed cup insert.

Figure 13:
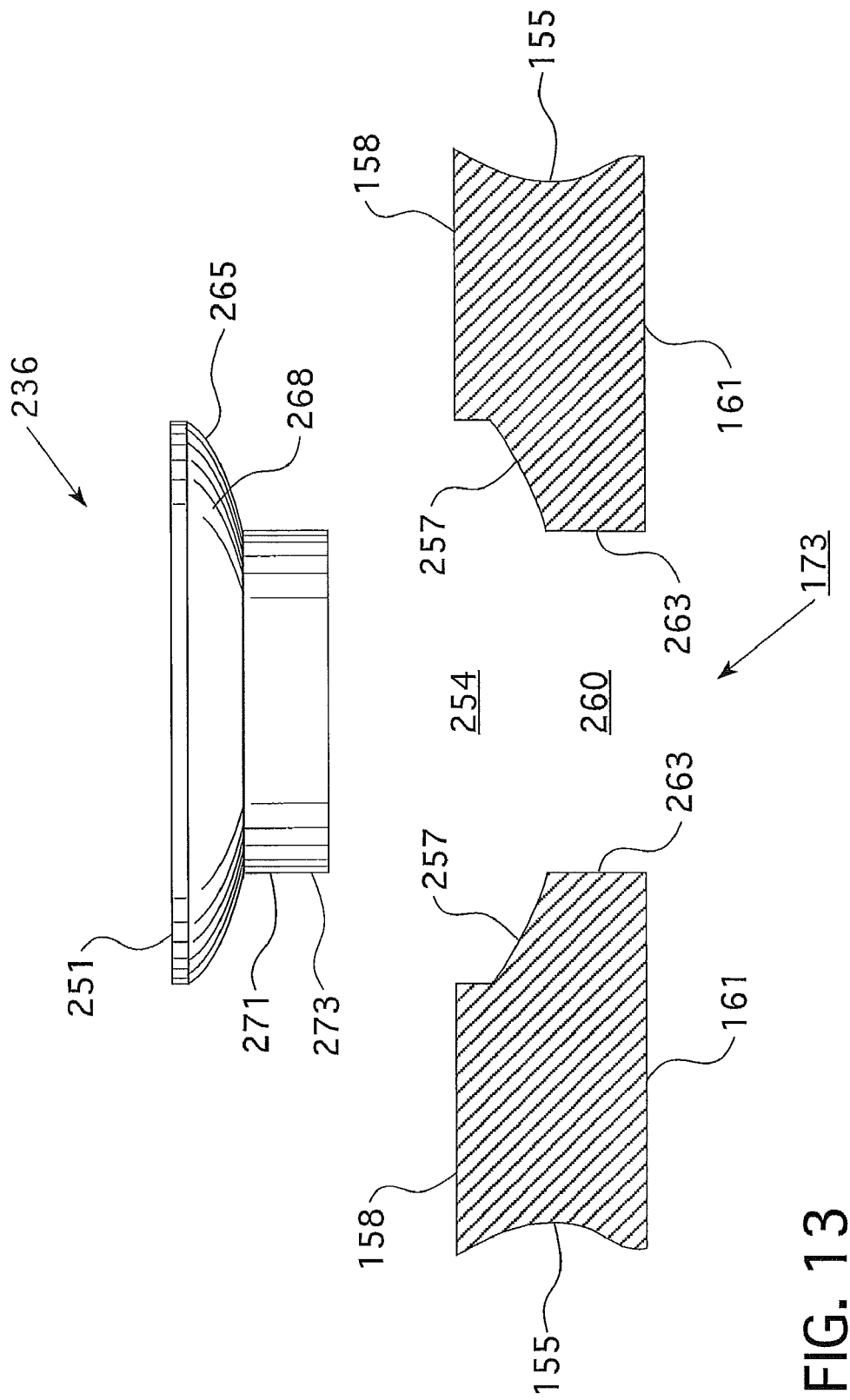
FIG. 13 is a representative exploded partial sectional and partial side elevational view of a cup insert and an outer tube perforation defined by surfaces that are shaped for fitting receipt of the cup insert.

The perforations of the outer tube may be dimensioned for fitting receipt of a cup insert therein. With reference to FIG. 13, perforation 173 of outer tube 155 comprises: an outer perforation portion 254 that is defined in part by inwardly sloping or angled sidewalls 257 (e.g., conical inward sloping sidewalls 257); and an inner perforation portion 260 that is defined in part by substantially cylindrical sidewalls 263. Cup insert 236 comprises: an outer cup insert portion 265 that is defined in part by exterior inwardly sloping (relative to outer rim 251) sidewalls 268 (e.g., exterior conical sidewalls 268); and an inner cup insert portion 271 that is defined by substantially cylindrical exterior sidewalls 273. Cup insert 236 is received within perforation 173, such that: at least a portion of exterior conical sidewalls 268 of outer cup insert portion 265 abut at least a portion of conical inward sloping sidewalls 257 of outer perforation portion 254 of perforation 173; and at least a portion of cylindrical exterior sidewalls 273 of inner cup insert portion 271 abut at least a portion of substantially cylindrical sidewalls 263 of inner perforation portion 260 of perforation 173.

Each cup insert may independently be fabricated from any suitable rigid material. For example, each cup insert may independently be fabricated from metals, plastic materials (thermoset plastic materials and/or thermoplastic materials—including those classes and examples as recited further herein), ceramics, wood and combinations thereof. In an embodiment, each cup insert is independently fabricated from a thermoplastic material having a melting point that is greater than that of the heated thermoplastic sheet with which the cup insert is contacted.

In the method of the present invention, the heated thermoplastic sheet is formed (e.g., by melt compounding/extrusion) from at least one thermoplastic composition. The thermoplastic composition includes at least one thermoplastic material. As used herein and in the claims, the term "thermoplastic material" and similar terms, means a plastic material that has a softening and melting point, and is substantially free of a three dimensional crosslinked network resulting from the formation of covalent bonds between chemically reactive groups, e.g., active hydrogen groups and free isocyanate groups. Examples of thermoplastic materials that may be included in the thermoplastic composition include, but are not limited to, thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polyolefins, thermoplastic (meth)acrylates, thermoplastic acrylonitrile-butadiene-styrene, thermoplastic styrene-acrylonitrile, thermoplastic acrylonitrile-stryrene-acrylate and combinations thereof (e.g., blends and/or alloys of at least two thereof).

In an embodiment of the present invention, the thermoplastic material of each thermoplastic composition is independently selected in each case from thermoplastic polyolefins. As used herein and in the claims, the term "polyolefin" and similar terms, such as "polyalkylene" and "thermoplastic polyolefin", means polyolefin homopolymers, polyolefin copolymers, homogeneous polyolefins and/or heterogeneous polyolefins. For purposes of illustration, examples of a polyolefin copolymers include those prepared from ethylene and one or more $C_3$-$C_{12}$ alpha-olefin, such as 1-butene, 1-hexene and/or 1-octene.

The polyolefins, from which the thermoplastic material of each thermoplastic composition, may in each case be independently selected include, but are not limited to, heterogeneous polyolefins, homogeneous polyolefins, and combinations thereof. The term "heterogeneous polyolefin" and similar terms means polyolefins having a relatively wide variation in: (i) molecular weight amongst individual polymer chains (i.e., a polydispersity index of greater than or equal to 3); and (ii) monomer residue distribution (in the case of copolymers) amongst individual polymer chains. The term "polydispersity index" (PDI) means the ratio of $M_w/M_n$, where $M_w$ means weight average molecular weight, and $M_n$ means number average molecular weight, each being determined by means of gel permeation chromatography (GPC) using appropriate standards, such as polyethylene standards. Heterogeneous polyolefins are typically prepared by means of Ziegler-Natta type catalysis in heterogeneous phase.

The term "homogeneous polyolefin" and similar terms means polyolefins having a relatively narrow variation in: (i) molecular weight amongst individual polymer chains (i.e., a polydispersity index of less than 3); and (ii) monomer residue distribution (in the case of copolymers) amongst individual polymer chains. As such, in contrast to heterogeneous polyolefins, homogeneous polyolefins have similar chain lengths amongst individual polymer chains, a relatively even distribution of monomer residues along polymer chain backbones, and a relatively similar distribution of monomer residues amongst individual polymer chain backbones. Homogeneous polyolefins are typically prepared by means of single-site, metallocene or constrained-geometry catalysis. The monomer residue distribution of homogeneous polyolefin copolymers may be characterized by composition distribution breadth index (CDBI) values, which are defined as the weight percent of polymer molecules having a comonomer residue content within 50 percent of the median total molar comonomer content. As such, a polyolefin homopolymer has a CDBI value of 100 percent. For example, homogenous polyethylene/alpha-olefin copolymers typically have CDBI values of greater than 60 percent or greater than 70 percent. Composition distribution breadth index values may be determined by art recognized methods, for example, temperature rising elution fractionation (TREF), as described by Wild et al, Journal of Polymer Science, Poly. Phys. Ed., Vol. 20, p. 441 (1982), or in U.S. Pat. No. 4,798,081, or in U.S. Pat. No. 5,089,321. An example of homogeneous ethylene/alpha-olefin copolymers are SURPASS polyethylenes, commercially available from NOVA Chemicals Inc.

The thermoplastic material of each thermoplastic composition may independently and optionally include a reinforcing material selected, for example, from glass fibers, glass beads, carbon fibers, metal flakes, metal fibers, polyamide fibers (e.g., KEVLAR polyamide fibers), cellulosic fibers, nanoparticulate clays, talc and mixtures thereof. If present, the reinforcing material is typically present in a reinforcing amount, e.g., in an amount of from 5 percent by weight to 60 or 70 percent by weight, based on the total weight of the thermoplastic material. The reinforcing fibers, and the glass fibers in particular, may have sizings on their surfaces to improve miscibility and/or adhesion to the thermoplastic materials into which they are incorporated, as is known to the skilled artisan.

In an embodiment of the invention, the reinforcing material is in the form of fibers (e.g., glass fibers, carbon fibers, metal fibers, polyamide fibers, cellulosic fibers and combinations of two or more thereof). The fibers typically have lengths (e.g., average lengths) of from 0.5 inches to 4 inches (1.27 cm to 10.16 cm). The thermoplastic sheet may include fibers having lengths that are at least 50 or 85 percent of the lengths of the fibers that are present in the feed materials from which the thermoplastic sheet is prepared, such as from 0.25 inches to 2 or 4 inches (0.64 cm to 5.08 or 10.16 cm). The average length of fibers present in the thermoplastic sheet may be determined in accordance with art recognized methods. For example, the thermoplastic sheet may be pyrolyzed to remove the thermoplastic material, and the remaining or residual fibers microscopically analyzed to determine their average lengths, as is known to the skilled artisan.

Fibers are typically present in the thermoplastic composition, and accordingly the thermoplastic sheet, in amounts selected independently from 5 to 70 percent by weight, 10 to 60 percent by weight, or 30 to 50 percent by weight (e.g., 40 percent by weight), based on the total weight of the thermoplastic sheet (i.e., the weight of the thermoplastic material, the fiber and any additives). Accordingly, the shaped thermoplastic sheet prepared by the method of the present invention may include fibers in amounts of from 5 to 70 percent by weight, 10 to 60 percent by weight, or 30 to 50 percent by weight (e.g., 40 percent by weight), based on the total weight of the thermoplastic sheet.

The fibers may have a wide range of diameters. Typically, the fibers have diameters of from 1 to 20 micrometers, or more typically from 1 to 9 micrometers. Generally, each fiber comprises a bundle of individual filaments (or monofilaments). Typically, each fiber is composed of a bundle of 10,000 to 20,000 individual filaments.

Typically, the fibers are uniformly distributed throughout the thermoplastic material of the thermoplastic sheet. During mixing of the fibers and the thermoplastic material, the fibers generally form bundles of fibers typically comprising at least 5 fibers per fiber bundle, and preferably less than 10 fibers per fiber bundle. While not intending to be bound by theory, it is believed based on the evidence at hand, that fiber bundles containing 10 or more fibers may result in a molded article (shaped thermoplastic sheet) having undesirably reduced structural integrity. The level of fiber bundles containing 10 or more fibers per bundle, may be quantified by determining the Degree of Combing present within a molded article. The number of fiber bundles containing 10 or more fibers per bundle is typically determined by microscopic evaluation of a cross section of the molded article, relative to the total number of microscopically observable fibers (which is typically at least 1000). The Degree of Combing is calculated using the following equation: 100×((number of bundles containing 10 or more fibers)/(total number of observed fibers)). Generally, the heated thermoplastic sheet and the shaped thermoplastic sheet each have a Degree of Combing of less than or equal to 60 percent, and typically less than or equal to 35 percent.

In addition or alternatively to reinforcing material(s), the thermoplastic composition(s), from which the heated thermoplastic sheet is prepared, may optionally include one or more additives. Additives that may be present in the thermoplastic composition include, but are not limited to, antioxidants, colorants, e.g., pigments and/or dyes, mold release agents, fillers, e.g., calcium carbonate, ultraviolet light absorbers, fire retardants and mixtures thereof. Additives may be present in the thermoplastic composition in functionally sufficient amounts, e.g., in amounts independently from 0.1 percent by weight to 10 percent by weight, based on the total weight of the thermoplastic composition.

In the method of the present invention, the heated thermoplastic sheet may be longitudinally and/or transversely stretched by rotation and/or movement of the tubular sheet retainers along the x-, y- and/or z-axes, while the heated thermoplastic sheet is between its glass transition temperature and below its melting temperature. During the stretching operations, the polymer molecules of the heated thermoplastic sheet, in the solid state, may become orientated in the stretching direction, thereby resulting in improved or increased physical properties (e.g., compressive strength) along the stretching direction. As such, the shaped thermoplastic sheet formed in accordance with the method of the present invention may exhibit uniaxial or biaxial orientation (relative to the polymer molecules). In addition, when the thermoplastic composition includes fibers, such as glass fibers, stretching of the heated thermoplastic sheet (by rotation and/or movement of the tubular sheet retainers along the x-, y- and/or z-axes) may also serve to orient the glass fibers uniaxilly or biaxially, thereby providing the shaped thermoplastic sheet with improved or increased physical properties along the stretching direction. Accordingly, the shaped thermoplastic sheet formed in accordance with the method of the present invention may alternatively or additionally exhibit uniaxial or biaxial fiber orientation.

In an embodiment of the method of the present invention, the heated thermoplastic sheet is a heated multilayer thermoplastic sheet having at least two thermoplastic layers, and accordingly the shaped thermoplastic sheet is a shaped multilayer thermoplastic sheet. Each thermoplastic layer may be formed from a separate thermoplastic composition having the same or different composition. For example, each thermoplastic composition (which may be the same or different) may be melt compounded so as to form separate molten thermoplastic compositions that are each separately fed into a multilayer sheet die, in accordance with art-recognized methods. The multilayer sheet die forms a heated multilayer thermoplastic sheet from the molten thermoplastic compositions fed therein.

Shaped thermoplastic sheets (or molded articles) that may be prepared in accordance with the method of the present invention may have complex 3-dimensional shapes, or relatively simple shapes, such as panels (e.g., wall panels, or wall panel covers). Molded articles that may be prepared according to the method of the present invention, include but are not limited to, ground water chambers, storm drains, culverts, storage structures, support structures or platforms (e.g., pallets) and shelters (e.g., shelters for domestic pets, such as dogs and cats).

The present invention has been described with reference to specific details of particular embodiments thereof. It is not intended that such details be regarded as limitations upon the scope of the invention except insofar as and to the extent that they are included in the accompanying claims.

What is claimed is:

1. A method of preparing a molded article comprising:
   (a) providing a mold apparatus comprising,
      (i) a first mold portion having an interior mold surface, and a perimeter edge, said interior mold surface having a contour and a plurality of perforations, and
      (ii) at least one tubular sheet retainer having an exterior surface, at least a portion of the exterior surface of said tubular sheet retainer having a plurality of perforations, said tubular sheet retainer having a longitudinal axis that is oriented along at least a portion of said perimeter edge, said tubular sheet retainer being reversibly and controllably positionable along at least one of an x-axis, a y-axis and a z-axis relative to said perimeter edge, and said tubular sheet retainer being rotatable around said longitudinal axis of said tubular sheet retainer;
   (b) positioning said tubular sheet retainer such that at least a portion the exterior surface of said tubular sheet retainer is located above said perimeter edge;
   (c) forming, from at least one thermoplastic composition, a heated thermoplastic sheet having a temperature that allows said heated thermoplastic sheet to be thermoformable, said heated thermoplastic sheet having a first surface and a second surface;
   (d) contacting a first portion of said second surface of said heated thermoplastic sheet with a portion of the exterior surface of said sheet retainer;
   (e) drawing reduced pressure through said plurality of perforations of said exterior surface of said tubular sheet retainer, thereby retaining said first portion of said second surface of said heated thermoplastic sheet on the exterior surface of said tubular sheet retainer;
   (f) contacting a second portion of the second surface of said heated thermoplastic sheet with at least a portion of the interior mold surface of said first mold portion;
   (g) (i) rotating each tubular sheet retainer, around said longitudinal axis of said tubular sheet retainer, independently at least one of towards said perimeter edge and away from said perimeter edge, and
      (ii) moving each tubular sheet retainer independently at least one of towards said perimeter edge and away from said perimeter edge, in each case independently along at least one of said x-axis, said y-axis and said z-axis;
   (h) drawing reduced pressure through said plurality of perforations of said interior mold surface of said first mold portion, such that said second portion of said second surface of said heated thermoplastic sheet substantially matches said contour of said interior mold surface of said first mold portion;
   (i) cooling said heated thermoplastic sheet thereby forming a shaped thermoplastic sheet that retains said contour of said interior mold surface of said first mold portion; and
   (j) removing said shaped thermoplastic sheet from said first mold portion,
   wherein said shaped thermoplastic sheet is said molded article.

2. The method of claim 1, wherein said heated thermoplastic sheet has an interior portion interposed between said first surface and said second surface of said heated thermoplastic sheet, said temperature of said heated thermoplastic sheet is substantially uniform through said first surface, said interior portion and said second surface of said heated thermoplastic sheet,
   when said first portion of said second surface of said heated thermoplastic sheet is drawn against the exterior surface of said tubular sheet retainer, and
   when said second portion of said second surface of said heated thermoplastic sheet is drawn against the interior mold surface of said first mold portion.

3. The method of claim 1, further comprising,
   melting said thermoplastic composition in an extruder thereby forming a molten thermoplastic composition, said extruder having a terminal end that is in fluid communication with a sheet die, and
   passing said molten thermoplastic composition through said sheet die, thereby forming said heated thermoplastic sheet.

4. The method of claim 3, wherein the steps of contacting and retaining said first portion of said second surface of said heated thermoplastic sheet on at least a portion of the exterior surface of said tubular sheet retainer occurs prior to necking of said heated thermoplastic sheet, and further wherein, retention of said first portion of said second surface of said heated thermoplastic sheet on the exterior surface of said tubular sheet retainer substantially prevents necking of said heated thermoplastic sheet.

5. The method of claim 3, wherein said first mold portion and said tubular sheet retainer are together positioned and moveable in a plane beneath said sheet die, and said sheet die is substantially stationary, said method further comprising moving said first mold portion and said tubular sheet retainer together in said plane beneath said sheet die as said thermoplastic sheet is formed, thereby facilitating contact between said heated thermoplastic sheet and said exterior surface of said tubular sheet retainer and said interior mold surface of said first mold portion.

6. The method of claim 3, further comprising detaching said heated thermoplastic sheet from said sheet die one of prior to, concurrently with and after the step of, (g) (i) rotating each tubular sheet retainer, around said longitudinal axis of said tubular sheet retainer, independently at least one of towards said perimeter edge and away from said perimeter edge, and (ii) moving each tubular sheet retainer independently at least one of towards said perimeter edge and away from said perimeter edge, in each case independently along at least one of said x-axis, said y-axis and said z-axis.

7. The method of claim 1, wherein said tubular sheet retainer has a cross sectional shape selected from the group consisting of polygonal shapes, circular shapes, oval shapes, irregular shapes and combinations thereof.

8. The method of claim 7, wherein said cross sectional shape of said tubular sheet retainer is a substantially circular shape, and said tubular sheet retainer is a substantially cylindrical sheet retainer.

9. The method of claim 1, wherein said tubular sheet retainer has an upper tubular zone and a lower tubular zone, and further wherein, when a first portion of said plurality of said perforations of said exterior surface of said tubular sheet retainer reside in said upper tubular zone, reduced pressure is drawn in through said first portion of said plurality of said perforations residing in said upper tubular zone, and concurrently when a second portion of said plurality of said perforations of said exterior surface of said tubular sheet retainer reside in said lower tubular zone, a gas at elevated pressure is pushed out through said second portion of said plurality of said perforations residing in said lower tubular zone, thereby retaining said heated thermoplastic sheet on said upper tubular zone, and concurrently substantially minimizing retention of said heated thermoplastic sheet on said lower tubular zone.

10. The method of claim 1, wherein said mold apparatus further comprises a second mold portion having an interior mold surface, said method further comprising contacting compressively said interior mold surface of said second mold portion with said first surface of said heated thermoplastic sheet, after said second portion of said second surface of said heated thermoplastic sheet has been drawn into contact with the interior mold surface of said first mold portion, and before cooling of said heated thermoplastic sheet.

11. The method of claim 1, wherein the steps of, (d) contacting said first portion of said second surface of said heated thermoplastic sheet with at least a portion of the exterior surface of said tubular sheet retainer, (e) drawing reduced pressure through said plurality of perforations of said exterior surface of said tubular sheet retainer, thereby retaining said first portion of said second surface of said heated thermoplastic sheet on the exterior surface of said tubular sheet retainer, (f) contacting said second portion of the second surface of said heated thermoplastic sheet with at least a portion of the interior mold surface of said first mold portion, and (g) (i) rotating each tubular sheet retainer, around said longitudinal axis of said tubular sheet retainer, independently at least one of towards said perimeter edge and away from said perimeter edge, and (ii) moving each tubular sheet retainer independently at least one of towards said perimeter edge and away from said perimeter edge, in each case independently along at least one of said x-axis, said y-axis and said z-axis, are performed substantially sequentially.

12. The method of claim 1, wherein the step of, (h) drawing reduced pressure through said plurality of perforations of said interior mold surface of said first mold portion, such that said second portion of said second surface of said heated thermoplastic sheet substantially matches said contour of said interior mold surface of said first mold portion, is performed one of concurrently and sequentially with the step of, (g) (i) rotating each tubular sheet retainer, around said longitudinal axis of said tubular sheet retainer, independently at least one of towards said perimeter edge and away from said perimeter edge, and (ii) optionally moving each tubular sheet retainer independently at least one of towards said perimeter edge and away from said perimeter edge, in each case independently along at least one of said x-axis, said y-axis and said z-axis.

13. The method of claim 1, further comprising, contacting a third portion of said second surface of said heated thermoplastic sheet with said perimeter edge of said first mold portion, thereby forming a seal between said third portion of said second surface of said heated thermoplastic sheet and said perimeter edge, and then subsequently performing the step of, (h) drawing reduced pressure through said plurality of perforations of said interior mold surface of said first mold portion, such that said second portion of said second surface of said heated thermoplastic sheet substantially matches said contour of said interior mold surface of said first mold portion.

14. The method of claim 1, wherein each thermoplastic composition comprises a thermoplastic material selected independently from the group consisting of thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polyolefins, thermoplastic (meth)acrylates, thermoplastic acrylonitrile-butadiene-styrene, thermoplastic styrene-acrylonitrile, thermoplastic acrylonitrile-stryrene-acrylate and combinations thereof.

15. The method of claim 1, wherein each thermoplastic composition comprises a reinforcing material selected independently from the group consisting of glass fibers, glass beads, carbon fibers, metal flakes, metal fibers, polyamide fibers, cellulosic fibers, nanoparticulate clays, talc and mixtures thereof.

16. The method of claim 15, wherein said reinforcing material is selected from glass fibers having a length of 1.27 cm to 10.16 cm.

17. The method of claim 1, wherein said heated thermoplastic sheet is a heated multilayer thermoplastic sheet comprising at least two thermoplastic layers.

* * * * *